(12) United States Patent
Soltani et al.

(10) Patent No.: US 12,560,758 B2
(45) Date of Patent: Feb. 24, 2026

(54) PHOTONIC INTEGRATED CIRCUIT WITH A RANDOM SPARSE OPTICAL PHASED ARRAY

(71) Applicant: Raytheon BBN Technologies, Corp., Cambridge, MA (US)

(72) Inventors: Moe D. Soltani, Belmont, MA (US); James G. Leatham, Los Angeles, CA (US); Duane D. Smith, Rancho Palos Verdes, CA (US); Alexander Niechayev, Riverside, CA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 291 days.

(21) Appl. No.: 17/985,004

(22) Filed: Nov. 10, 2022

(65) Prior Publication Data

US 2023/0144501 A1 May 11, 2023

Related U.S. Application Data

(60) Provisional application No. 63/278,024, filed on Nov. 10, 2021.

(51) Int. Cl.
*G02B 6/12* (2006.01)
*G02B 6/125* (2006.01)

(52) U.S. Cl.
CPC ......... *G02B 6/12019* (2013.01); *G02B 6/125* (2013.01); *G02B 2006/12142* (2013.01)

(58) Field of Classification Search
CPC ............................................... G02B 6/12009
See application file for complete search history.

(56) References Cited

U.S. PATENT DOCUMENTS

| | | | |
|---|---|---|---|
| 11,644,621 B2 | 5/2023 | Yengst et al. | |
| 2015/0346340 A1* | 12/2015 | Yaacobi | G01S 7/499 |
| | | | 356/5.11 |
| 2018/0188452 A1* | 7/2018 | Sun | G01S 17/42 |

OTHER PUBLICATIONS

Hashemi, "A Review of Semiconductor-Based Monolithic Optical Phased Array Architectures", IEEE Open Journal of the Solid-State Circuits Society, vol. 1, Oct. 15, 2021, pp. 222-234.

(Continued)

*Primary Examiner* — Chad H Smith
(74) *Attorney, Agent, or Firm* — CANTOR COLBURN LLP

(57) ABSTRACT

A photonic integrated circuit (PIC) is disclosed herein. The PIC can include a substrate, a main optical waveguide supported by the substrate. The main optical waveguide can be in communication with an electromagnetic radiation source, and configured to receive electromagnetic radiation from the electromagnetic radiation source. A first branch optical waveguide can be optically coupled to the main optical waveguide at a first location. An optical phased array (OPA) can include plurality of array elements, each having an optical antenna and an optical phase modulator. At least some array elements within a first subset of the plurality of array elements can be optically coupled to the first branch optical waveguide wherein locations of at least some of the plurality of array elements are aperiodic in one or more directions on the substrate.

17 Claims, 13 Drawing Sheets

(56)         References Cited

OTHER PUBLICATIONS

Notification of Transmittal of the International Search Report and the Written Opinion of the International Searching Authority, or the Declaration; PCT/US2022/049606; Feb. 23, 2023, 15 pages.

Tin Komljenovic et al. "Sparse aperiodic arrays for optical beamforming and LIDAR", vol. 25, No. 3 | Feb. 6, 2017 | Optics Express 2511 (18 pages).

Fatemi, et al., "A Nonuniform Sparse 2-D Large-FOV Optical Phased Array With a Low-Power PWM Drive", May 5, 2019, IEEE Journal of Solid-State Circuits, vol. 54, No. 5, 16 pages.

Guo, et al., "Integrated Optical Phased Arrays for Beam Forming and Steering", Apr. 20, 2021, Appl. Sci. 2021, 11, 4017, 41 pages.

Larocque, et al., "Beam steering with ultracompact and low-power silicon resonator phase shifters", Nov. 11, 2019, Optics Express, 34639, vol. 27, No. 24/25, 16 pages.

Lo,, "A Mathematical Theory of Antenna Arrays with Randomly Spaced Elements", IEEE Transaction on Antennas and Propagation 12, 257 (1964), 12 pages.

Miller, et al., "Large-scale optical phased array using a low-power multi-pass silicon photonic platform", Jan. 2, 2020, Optica vol. 7, No. 1 , 4 pages.

Poulton, et al., "Coherent Solid-State LIDAR with Silicon Photonic Optical Phased Arrays", Sep. 12, 2017, Optics Letters, 41, 4091.

Poulton, et al., "Photonic Crystal Microcavities in a Microelectronics 45-nm SOI CMOS Technology", Mar. 15, 2015, IEEE Photonics Technology Letters, vol. 27, No. 6, 4 pages.

Sun et al., "Large-scale nanophotonic phased array", Jan. 10, 2023, Nature vol. 493, pp. 195-199; 5 pages.

Xie, et al., "Heterogeneous silicon photonics sensing for autonomous cars", Feb. 4, 2019, Optics Express 3642, vol. 27, No. 3, 22 pages.

* cited by examiner (A)          (B)

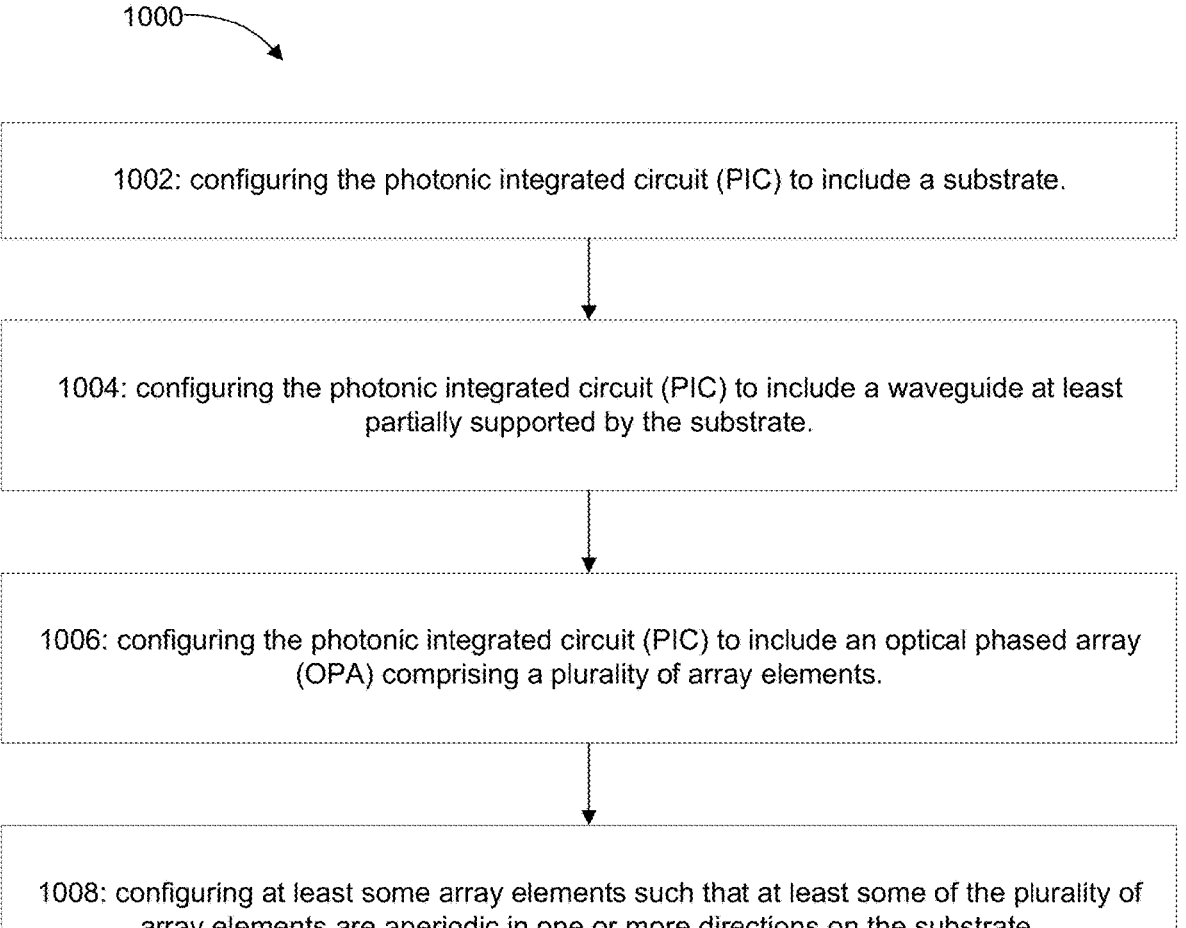

1000

1002: configuring the photonic integrated circuit (PIC) to include a substrate.

1004: configuring the photonic integrated circuit (PIC) to include a waveguide at least partially supported by the substrate.

1006: configuring the photonic integrated circuit (PIC) to include an optical phased array (OPA) comprising a plurality of array elements.

1008: configuring at least some array elements such that at least some of the plurality of array elements are aperiodic in one or more directions on the substrate.

*FIG. 16*

PHOTONIC INTEGRATED CIRCUIT WITH A RANDOM SPARSE OPTICAL PHASED ARRAY

CROSS-REFERENCE TO RELATED APPLICATION

This application claims the benefit of U.S. Provisional Application No. 63/278,024 which was filed on Nov. 10, 2021, which is incorporated by reference herein in its entirety.

BACKGROUND

Optical phased arrays (OPA) are sometimes used in photonic integrated circuits (PIC) to facilitate transmission or reception of optical signal beams. A photonic integrated circuit can have multiple photonic or light-based functions integrated into the photonic integrated circuit. OPAs can be used to transmit optical signal beams by utilizing antenna elements to form the optical signal beams. The phases and/or amplitudes associated with the optical signal beams transmitted from the antenna elements can be controlled or adjusted by one or more optical phase and/or amplitude modulators in order to perform beam shaping, beam pointing, and/or beam steering in one or more dimensions.

However, two-dimensional, far-field beam steering cannot be performed in conventional OPAs when the number of antenna elements becomes too large because of challenges in optical and electrical routing (e.g., routing of waveguides and electrical wiring). In such arrays, the circuit topology resulting from the many antenna elements does not allow scaling and interferes with the optical and electrical routing on the OPA because of limited space allowed for the optical and electric routing on the PIC. Increasing distances between array elements to allow for more space for the optical and electric routing undesirably results in large grating lobes from the optical signal beam or receive beam gain envelope and reduces the steering range for the optical signal beam. Accordingly, scalability of the OPA is often not possible without causing severe degradation in optical signals.

Furthermore, large scale OPAs that accomplish two-dimensional beam steering do so by sweeping the wavelength of a source laser input into the OPA in order to steer the beam in one of the two directions. This makes the large scale OPAs unworkable for applications that require a fixed laser wavelength or a laser wavelength of a finite tuning range. To alleviate the above problems, alternative arrangements in optical and electrical routing for OPAs that allow for scalability and side lobe suppression in OPAs are needed in the field of photonic integrated circuits (PIC).

BRIEF DESCRIPTION OF THE DRAWINGS

Features and advantages of the subject technology will be apparent from the detailed description which follows, taken in conjunction with the accompanying drawings, which together illustrate, by way of example, features of the subject technology; and, wherein:

FIG. 16 shows a method of configuring a photonic integrated circuit according to one example of the present disclosure.

Figures 1, 2:
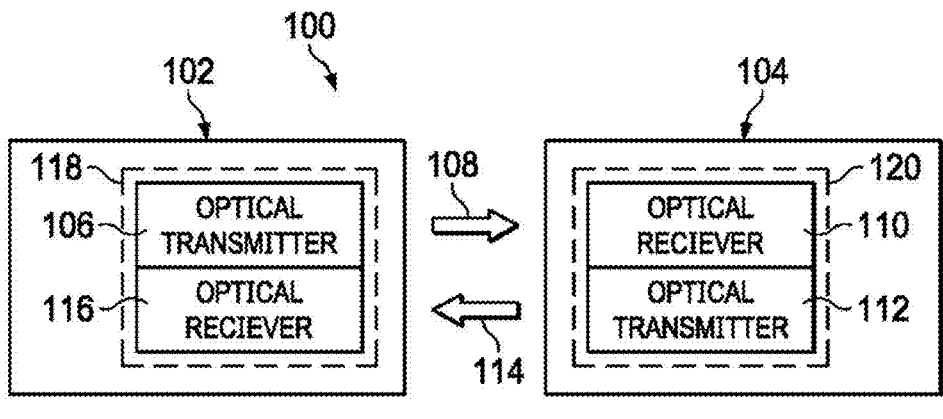
FIG. 1 shows a schematic view of a pair optical transceiver nodes including optical transmitters and/or optical receivers according to one example of the present disclosure.
FIG. 2 shows an isometric view of an optical apparatus housing the optical transmitters and/or optical receivers according to one example of the present disclosure.

Reference will now be made to the examples illustrated, and specific language will be used herein to describe the same. It will nevertheless be understood that no limitation of scope is thereby intended.

DETAILED DESCRIPTION

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

Given the above, there exists a need for a photonic integrated circuit with an optical phased array that is capable of two-dimensional, far-field beam steering with a large number of antenna elements. The photonic integrated circuit and optical phased array described herein are capable of solving the above-mentioned problems. The optical phased array (OPA) described herein has array elements (e.g., nanoantenna elements) spaced at distances that are greater than a half wavelength of emitted electromagnetic radiation (i.e., optical energy) but still provides adequate side lobe suppression. The OPA is also scalable to larger sizes to allow for additional room for optical and electric routing. The optical phased array further includes nanoantenna elements positioned in the array by genetic algorithm to minimize side lobe interference in the optical signal beams emitted (or receive gain envelope) from the OPA at a plurality of scanning angles for the optical signal beam. The OPA described herein is further a large scale OPAs that accomplishes two-dimension beam steering without sweeping the wavelength of a source laser input through multiple wavelengths. The OPA is capable of receiving a single coherent wavelength of electromagnetic radiation and steering the optical signal beam by phase modulation of individual nanoantenna elements.

In one example of the present disclosure, a photonic integrated circuit (PIC) can include a substrate and a waveguide at least partially supported by the substrate. The waveguide can be in communication with at least one of an electromagnetic radiation (optical energy) source and a receiver. The waveguide can be configured to facilitate the propagation of optical signal beams. The PIC can further include an optical phased array (OPA) including a plurality of array elements, each of the plurality of array elements including an optical antenna and an optical phase modulator associated with the optical antenna. The optical phase modulator can be operable to modulate the optical signal beams within a segment of the waveguide in communication with the optical antenna. At least some array elements of the plurality of array elements can be optically coupled to the waveguide at aperiodic locations on the substrate.

In some examples, the optical phased array is a sparse array in which the plurality of array elements can be positioned such that the distance between array elements is greater than ½ of a wavelength of the electromagnetic radiation from the electromagnetic radiation source.

In some examples, the aperiodic locations of the array elements in the optical phased array (OPA) can be set such that an emitted optical signal beam or receive gain envelope from the plurality of array elements has a peak to side lobe ratio that is greater than a predetermined threshold value. The peak to side lobe ratio can be a ratio of a peak beam intensity to a grating lobe intensity in the emitted beam or receive gain envelope.

In some examples, the aperiodic locations of the array elements in the optical phased array (OPA) can be pseudo-random positions set such that an emitted optical signal beam or receive gain envelope from the plurality of array elements has peak to side lobe ratios that are greater than a predetermined threshold value at each of a plurality of scan angles of the emitted optical beam or receive gain envelope.

In some examples, the plurality of scan angles of the emitted optical beam or receive gain envelope can comprise angles between −60 degrees and +60 degrees.

In some examples, the pseudo-random positions of the array elements can be set such that the emitted optical signal beam or receive gain envelope from the plurality of array elements has peak to side lobe ratios that are greater than a predetermined threshold value at each of the plurality of scan angles between −60 degrees and +60 degrees.

In some examples, the pseudo-random positions of the array elements can be set such that the emitted optical signal beam or receive gain envelope is continuously steerable through the plurality of scan angles by control of phase adjustments made by one or more of the optical phase modulators.

In some examples, the pseudo-random positions of the array elements can be set such that the emitted optical signal beam or receive gain envelope from the plurality of array elements is continuously steerable through the plurality of scan angles by control of the phase adjustments made by one or more of the optical phase modulators with a single coherent wavelength of electromagnetic radiation supplied from the electromagnetic radiation source.

In some examples, the pseudo-random positions of the array elements can be set such that the emitted optical signal beam or receive gain envelope from the plurality of array elements is steerable in two dimensions by control of the phase adjustments made by one or more of the optical phase modulators.

In some examples, locations of at least some of the plurality of array elements can be aperiodic in one or more directions on the substrate.

In some examples, the photonic integrated circuit (PIC) can further include at least one of a source laser as the electromagnetic radiation source configured to generate optical energy, the antenna elements configured to transmit the optical signal beams based on the optical energy, and a receiver configured to receive and process the optical signal beams received by the antenna elements.

In some examples, the source laser can generate optical energy at a single coherent wavelength.

In some examples, the waveguides are optical waveguides.

In some examples, an on-chip electronic circuit can be disposed on the substrate, and in electrical communication with the optical phase and/or amplitude modulators of each of the plurality of array elements. The on-chip electronic circuit can be configured to apply voltages to each of the optical phase and/or amplitude modulators to modulate the optical signal beams within a segment of the waveguide in communication with the optical antenna.

In some examples, the photonic integrated circuit (PIC) can include a plurality of layers. The plurality of layers can include a photonic layer comprising the optical phased array (OPA) and the waveguide. The plurality of layers can further include an electronic layer comprising a digital read-in integrated circuit (DRIIC) in electrical communication with each of the optical phase and/or amplitude modulators of the array elements, the digital read-in integrated circuit being configured to apply voltages to control each of the optical phase and/or amplitude modulators.

In some examples, the electronic layer can include one or more CMOS circuits.

In another example of the present disclosure, a photonic integrated system can include an electromagnetic radiation source (i.e., optical energy source). The system can further include a photonic integrated circuit (PIC). The photonic integrated circuit (PIC) can include a substrate and a waveguide at least partially supported by the substrate. The waveguide can be in communication with at least one of an electromagnetic radiation source and a receiver. The waveguide can be configured to facilitate the propagation of optical signal beams. The PIC can further include an optical phased array (OPA) including a plurality of array elements, each of the plurality of array elements including an optical antenna and an optical phase and/or amplitude modulator associated with the optical antenna. The optical phase modulator can be operable to modulate the optical signal beams within a segment of the waveguide in communication with the optical antenna. At least some array elements of the plurality of array elements can be optically coupled to the waveguide wherein locations of at least some of the plurality of array elements can be aperiodic in one or more directions on the substrate.

In some examples of the photonic integrated system, the optical phased array can be a sparse array in which the plurality of array elements are positioned such that the distance between array elements is greater than ½ of a wavelength of the electromagnetic radiation from the electromagnetic radiation source.

In some examples of the photonic integrated system, the aperiodic locations of the array elements in the optical phased array (OPA) can be set such that an emitted optical signal beam or receive gain envelope from the plurality of array elements has a peak to side lobe ratio that is greater than a predetermined threshold value. The peak to side lobe ratio can be a ratio of a peak beam intensity to a grating lobe intensity in the emitted beam or receive gain envelope.

In some examples of the photonic integrated system, the aperiodic locations of the array elements in the optical phased array (OPA) can be pseudo-random positions set such that an emitted optical signal beam or receive gain envelope from the plurality of array elements has peak to side lobe ratios that are greater than a predetermined threshold value at each of a plurality of scan angles of the emitted optical beam or receive gain envelope.

In another example of the present disclosure, a method can include steps of configuring a photonic integrated circuit (PIC). The method can include a step of configuring the photonic integrated circuit (PIC) to include a substrate. The method can further include a step of configuring the photonic integrated circuit (PIC) to include a waveguide at least partially supported by the substrate, the waveguide being in communication with at least one of an electromagnetic radiation source and a receiver, the waveguide being configured to facilitate the propagation of optical signal beams. The method can further include a step of configuring the photonic integrated circuit (PIC) to include an optical phased array (OPA) comprising a plurality of array elements. Each of the plurality of array elements can include an optical antenna and an optical phase and/or amplitude modulator associated with the optical antenna. The optical phase and/or amplitude modulator can be operable to modulate the optical signal beams within a segment of the waveguide in communication with the optical antenna. The method can further include a step of configuring at least some array elements of the plurality of array elements to be optically coupled to the waveguide wherein locations of at least some of the plurality of array elements can be aperiodic in one or more directions on the substrate.

Optical Phased Array and Photonic Integrated Circuit Configuration

FIGS. 1-16, described below, and the various examples used to describe the principles of the present disclosure are by way of illustration only and should not be construed in any way to limit the scope of this disclosure. Those skilled in the art will understand that the principles of the present disclosure can be implemented in any type of suitably arranged device or system.

As noted above, transmitting OPAs utilize antenna elements to form transmitted optical signal beams, where phases associated with the antenna elements can be controlled or adjusted to perform beam shaping, beam pointing, or beam steering. The antenna elements and various other components of, or associated with, an OPA can be implemented using one or more PICs. The disclosure provides a compact and scalable design that is provided to support a PIC-based communication optical signal beam transmission system. The design can be provided in various configurations to support different space-, air-, and ground-based systems.

The OPA can include a two-dimensional (2D) pseudo-random sparse array (RSA) of silicon nano-antenna elements or other antenna elements, where relative phases of the antenna elements can be electronically controlled to support high-speed non-mechanical beam forming and beam steering. The random sparse array (RSA) of antenna elements can also support features such as: high side lobe suppression for the transmitted optical signal beam or the receive gain envelope, a fixed wavelength laser source on transmit or receive, a laser of a finite tunable wavelength range, sufficient room for optical and electronic routing, and scalability without inducing disturbances or degradation in the operation of the OPA. In some cases, the array can support a unit cell architecture with low-power resonant micro-rings or other modulators so that each antenna element can be independently calibrated and controlled. If desired, a supercell design (which logically groups multiple antenna elements and related components into multiple supercells) can help provide routing simplicity and enable scalability in size. Also, in some cases, amplitude modulation of each supercell can be used to provide control of the transmit power and shaping of the beam, such as Taylor weighting and other techniques.

The principles described herein can have various advantages or benefits depending on the implementation. For example, the random sparse, optical phased array described herein allows for efficient electrical and optical routing of the OPA while still allowing enough space and flexibility for scalability of the OPA and PIC, even with large amounts of antenna elements. Additionally, side lobes of the optical signal beams can be suppressed by the random sparse placement of antenna elements on the OPA. Furthermore, 2-D optical beam steering can be accomplished with fixed wavelength or finite range wavelength laser sources.

FIG. 1 illustrates an exemplar system 100 supporting photonic integrated circuit-based communication according to this disclosure. As shown in FIG. 1, the system 100 can include two nodes 102 and 104 that communicate with one another optically. Each node 102 and 104 represents a ground, air, or space-based system that can transmit and/or receive data using optical communications. The nodes 102 and 104 can engage in unidirectional communication with one another in which one of nodes 102 or 104 only transmits and the other node 104 or 102 only receives, at least with respect to each other). However, it will be appreciated that, as shown in FIG. 1, the nodes 102 and 104 can engage in bidirectional communication with one another where both nodes 102 and 104 are capable of both transmission and reception of optical signal beams.

The node 102 in this example includes an optical transmitter 106, which generally operates to produce optical signal beams 108 used for communication or other purposes. For example, the optical transmitter 106 can encode information onto the optical signal beams 108, such as by using suitable amplitude, phase, frequency, and/or other modulation(s) of light. The optical signal beams 108 can be transmitted through free space or other transmission medium to the node 104, where an optical receiver 110 receives and processes the optical signals 108. For instance, the optical receiver 110 can identify the amplitude, phase, frequency, and/or other modulation(s) of light in the optical signal beams 108 and use the identified modulation(s) to recover the information encoded onto the optical signal beams 108. Any suitable type of modulation/demodulation scheme can be used here to encode and decode the optical signal beams 108. Since the nodes 102 and 104 are bidirectional in this example, the same process can be used in the opposite direction, meaning an optical transmitter 112 of the node 104 produces optical signal beams 114 that are transmitted towards the node 102 and received and processed by an optical receiver 116 of the node 102.

Note that while the optical transmitter 106 and the optical receiver 116 are shown here as separate components, they can be integrated into a single optical transceiver 118 to allow the same PIC-based structure to be used for both transmission and reception of optical signal beams. Similarly, while the optical transmitter 112 and the optical receiver 110 are shown here as separate components, they can be integrated into a single optical transceiver 120 to allow the same PIC-based structure to be used for both transmission and reception of optical signal beams. As described in more detail below, each of the optical transmitters 106 and 112, optical receivers 110 and 116, or optical transceivers 118 and 120 includes at least one PIC-based optical phased array, which is used to transmit and/or receive the optical signal beams 108 and 114.

The optical transmitters, receivers, and transceivers described in this disclosure can be used in a large number of applications. For example, optical transmitters, receivers, or transceivers can be used in data centers or telecommunication systems to transport information rapidly between locations, including the transport of large amounts of information over very large distances. Optical transmitters, receivers, or transceivers can be used in consumer or commercial electronic devices, biomedical devices, or advanced computing devices. Optical transmitters, receivers, or transceivers can be used in airplanes, drones, satellites, autonomous vehicles, rockets, missiles, or other commercial or defense-related systems. In general, this disclosure is not limited to any particular application of the optical transmitters, receivers, and transceivers.

Although FIG. 1 illustrates one example of a system 100 supporting photonic integrated circuit-based communication, various changes can be made to FIG. 1. For example, while only two nodes 102 and 104 are shown here, the system 100 can include any suitable number of nodes that engage in any suitable unidirectional, bidirectional, or other communications with each other. Also, each node of the system 100 can include any suitable number of optical transmitters, receivers, or transceivers that communicate via any number of optical signal beams. In addition, the system 100 is shown in simplified form here and can include any number of additional components in any suitable configuration as needed or desired.

FIG. 2 illustrates an example apparatus 200 supporting photonic integrated circuit-based communication according to this disclosure. For ease of explanation, the apparatus 200 can be described as representing or being used as part of one or more nodes 102 and 104 in the system 100 of FIG. 1. However, the apparatus 200 can be used as, in, or with any other suitable device or system.

As shown in FIG. 2, the apparatus 200 can include a housing 202, which can be used to encase and protect other components supporting PIC-based communication. The housing 202 can be formed from any suitable material(s), such as one or more metals, and in any suitable manner. The housing 202 can also have any suitable size, shape, and dimensions. The housing 202 can be secured to a support structure 204, which represents any suitable structure on or to which the housing 202 can be secured. A cover 206 can be removably connected to the housing 202 in order to selectively provide access to an interior space of the housing 202. The housing 202 can also define at least one aperture 208 through which outgoing or incoming optical signal beams, such as the optical signal beams 108 and 114, can pass. In this particular example, there is a single aperture, although the housing 202 can define multiple apertures (such as one aperture for transmission and one aperture for reception).

At least one optical transmitter, optical receiver, and/or optical transceiver is positioned within the housing 202 and communicates via the at least one aperture 208. For example, in some cases, the apparatus 200 can include at least one optical transmitter 210a (which can represent at least one instance of the optical transmitter 106 or 112) and at least one optical receiver 210b (which can represent at least one instance of the optical receiver 110 or 116). In one example, the optical transmitter 210a and the optical receiver 210b can be positioned side-by-side on a common support 212 allowing the optical transmitter 210a and the optical receiver 210b to respectively transmit or receive optical signal beams through the aperture 208. In other cases, the apparatus 200 can include at least one optical transceiver 214 (which can represent at least one instance of the optical transceiver 118 or 120) on a support 216, where the optical transceiver 214 can communicate via the aperture 208. The optical transceiver 214 can support optical signal beam transmissions at one or more wavelengths and optical signal beam receptions at one or more different wavelengths. It will be appreciated by those skilled in the art that any suitable combination of at least two optical transmitter(s), optical receiver(s), and/or optical transceiver(s) can also be used in the apparatus 200.

Although FIG. 2 illustrates one example of an apparatus 200 supporting photonic integrated circuit-based communication, various changes can be made to FIG. 2. PIC-based communications can be used in or by a wide range of devices and are not limited to the specific apparatus shown here. For instance, the housing 202 can instead be formed as a rotatable gimbal that can redirect one or more optical transmitters, optical receivers, or optical transceivers as needed or desired. In addition, the apparatus 200 can include components that support the generation and transmission and/or the reception and processing of beacon optical signal beams, which can be used to help identify where the apparatus 200 should be aimed to engage in optical communications, or other signals.

Figure 3:
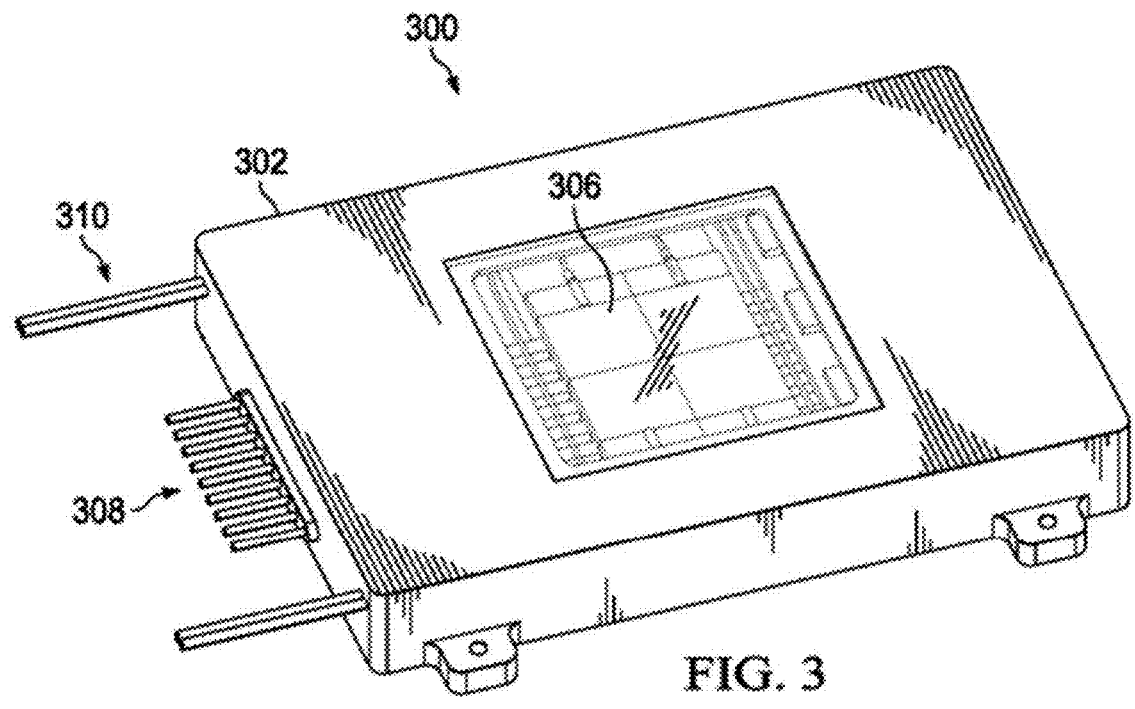
FIG. 3 shows a perspective view of a photonic integrated circuit-based optical device according to one example of the present disclosure.
Figure 4:
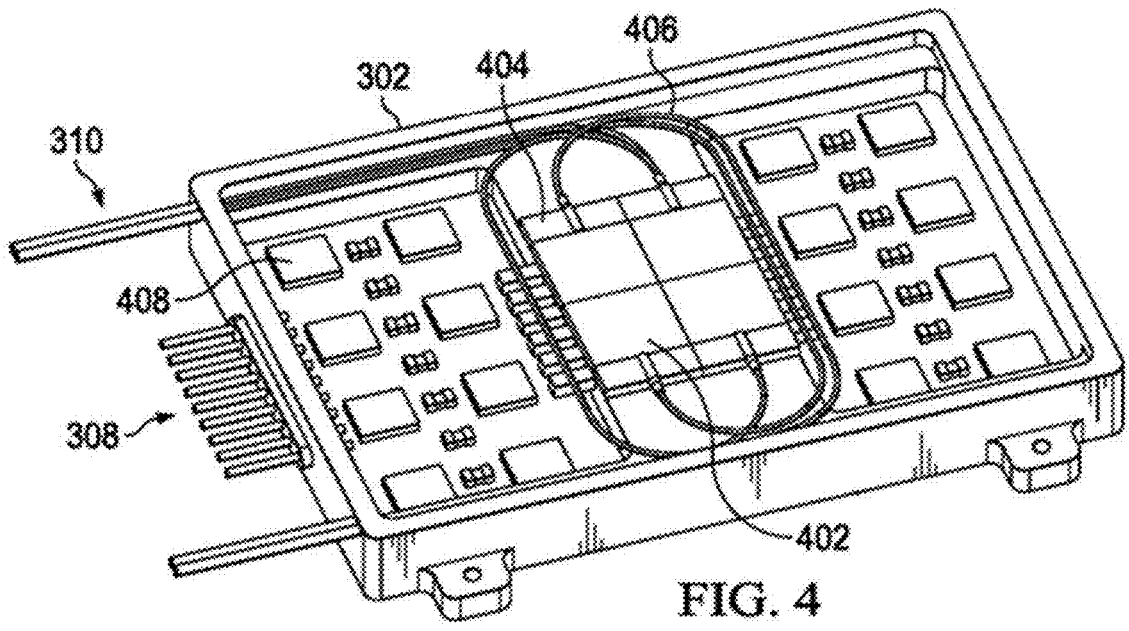
FIG. 4 shows a perspective view of the interior of the photonic integrated circuit-based optical device in FIG. 3.
Figure 5:
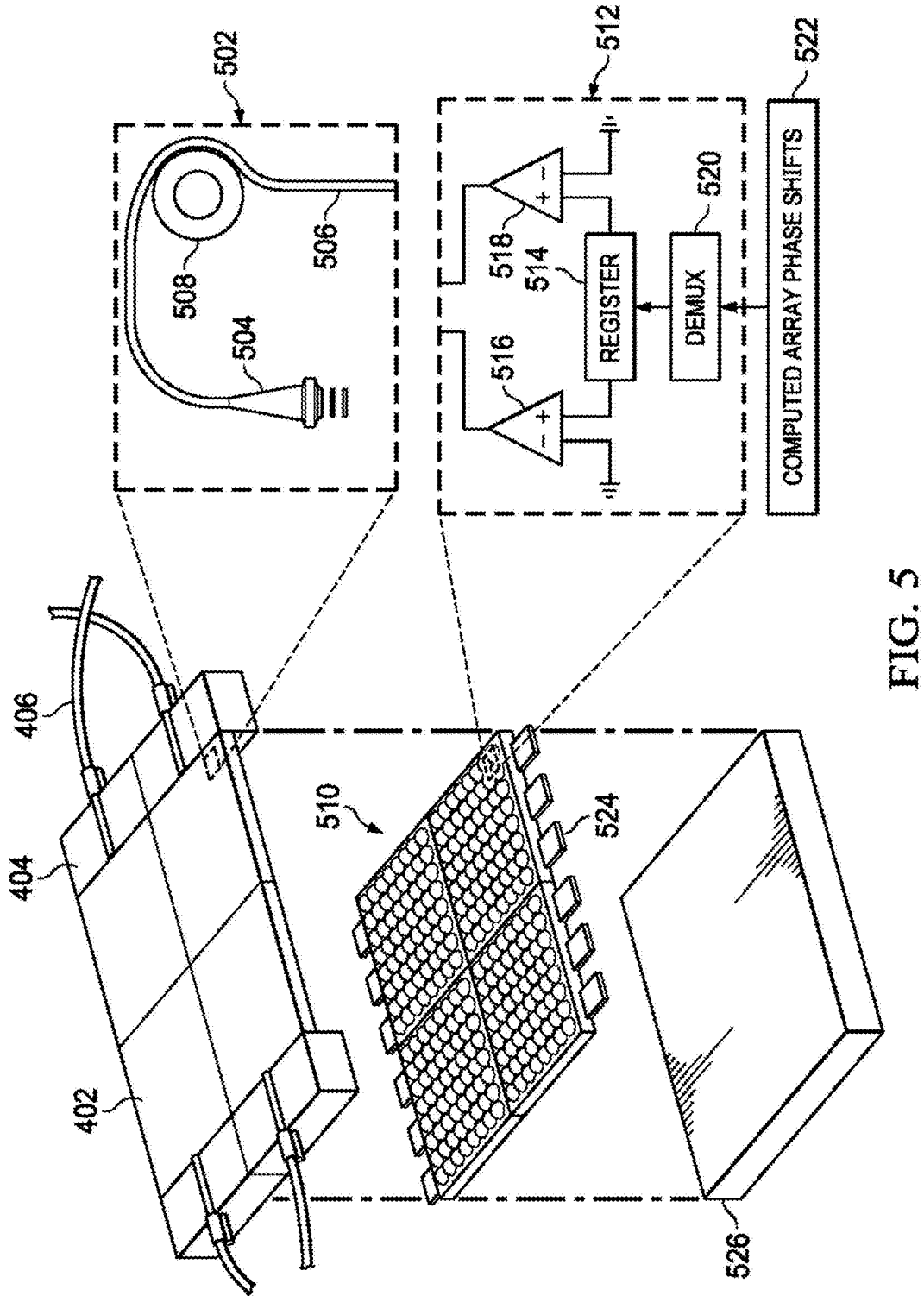
FIG. 5 shows a partial exploded view of the photonic integrated circuit-based optical device in FIG. 3.

FIGS. 3-5 illustrate an example photonic integrated circuit-based optical device 300 according to this disclosure. For ease of explanation, the optical device 300 is described as being used to implement one of the optical transmitter 210a, optical receiver 210b, or optical transceiver 214 of FIG. 2, which can be used in the system 100 of FIG. 1. However, the optical device 300 can be used in any other suitable apparatus and in any other suitable system.

As shown in FIG. 3, the optical device 300 includes a package 302, which surrounds and protects electronic and optical components of an optical transmitter 210a, optical receiver 210b, or optical transceiver 214. The package 302 can be formed from any suitable material(s), such as one or more metals, and in any suitable manner. The package 302 can also have any suitable size, shape, and dimensions and can have any suitable form without any intended limitation.

The package 302 can includes an optical window 306, which is at least partially optically transparent with respect to the optical signal beams being transmitted from or received by the optical device 300). The optical window 306 can be formed from any suitable material(s), such as borosilicate glass or other glass, and in any suitable manner. The optical window 306 can also have any suitable size, shape, and dimensions.

The package 302 can also include one or more electrical connections 308 that can be used to transport one or more electrical signals between the interior and the exterior of the package 302. The one or more electrical signals can be used here for any suitable purposes, such as to control one or more operations of the optical device 300. As a particular example, the one or more electrical signals can be used for controlling phase and/or amplitude modulators to control phases or amplitudes of optical signal beams from the antenna elements of a photonic integrated circuit in the optical device 300. The package 302 can further include one or more optical inputs/outputs 310 (e.g., fiber optics), which can be used to provide one or more input signals to the optical device 300 and/or receive one or more output signals from the optical device 300. The one or more input signals can carry information to be transmitted from the optical device 300. The one or more output signals can carry information received at and recovered by the optical device 300. In this example, there are two fiber inputs/outputs 310, although the optical device 300 can include a single fiber input/output 310 or more than two fiber inputs/outputs 310. Note, however, that no fiber inputs/outputs 310 are needed if all optical generation and processing occurs using components within the package 302, in which case the electrical connections 308 can be used to transport information to or from the optical device 300.

As shown in FIG. 4, a photonic integrated circuit 402 is positioned within the package 302, namely at a location where the photonic integrated circuit 402 can transmit and/or receive optical signal beams through the optical window 306. As described below, the photonic integrated circuit 402 can be used to support transmission and/or reception of optical signal beams, depending on the design of the photonic integrated circuit 402. The photonic integrated circuit 402 can also support a number of additional optical functions as needed or desired. The photonic integrated circuit 402 can be formed from any suitable material(s), such as silicon, indium phosphide, or gallium arsenide, and in any suitable manner. The photonic integrated circuit 402 can also have any suitable size, shape, and dimensions. As a particular example, the photonic integrated circuit 402 can be square and have an edge length of about 40 mm, although any other suitable sizes and shapes can be used here.

Fiber mounts 404 can be used to couple to optical fibers 406 at locations where the optical fibers 406 can provide optical signals to and/or receive optical signals from the photonic integrated circuit 402. For example, the optical fibers 406 can provide optical signals from a source laser to the photonic integrated circuit 402 for use during outgoing transmissions of optical signal beams. The optical fibers 406 can also or alternatively provide optical signals received by the photonic integrated circuit 402 to a receiver for processing. Each fiber mount 404 can include any suitable structure configured to be coupled to an optical fiber 406. Each optical fiber 406 represents any suitable length of an optical medium configured to transport optical signals to or from a photonic integrated circuit 402. Note that while four fiber mounts 404 and optical fibers 406 are shown here, the optical device 300 can include, one, two, three, or more than four fiber mounts 404 and optical fibers 406. Also note that no fiber mounts 404 and/or optical fibers 406 are required if all optical generation and processing occurs using components of the photonic integrated circuit 402.

An electronic control board 408 includes electronic components, such as one or more integrated circuit chips and other components, that control the operation of the photonic integrated circuit 402. For example, the electronic control board 408 can include one or more components that calculate desired phases for optical signal beams to be generated by antenna elements of the photonic integrated circuit 402, which allows the electronic control board 408 to control beam forming or beam steering operations from the PIC. Additionally or alternatively, the electronic control board 408 can include one or more components that calculate desired phases to be applied to optical signals received by antenna elements of the photonic integrated circuit 402, which allows the electronic control board 408 to control wavefront reconstruction operations. The electronic control board 408 includes any suitable components configured to perform one or more desired functions related to a photonic integrated circuit 402.

As shown in FIG. 5, the photonic integrated circuit 402 itself can include a number of array elements 502, which represent PIC unit cells of the photonic integrated circuit 402. Each array element 502 can be configured to transmit or receive one or more optical signals. The photonic integrated circuit 402 can include any suitable number of array elements 502, possibly up to and including a very large number of array elements 502. In some embodiments, for example, the photonic integrated circuit 402 can include an array of elements 502 up to a size of 1024×1024 (meaning over one million array elements 502) or even larger. The size of the photonic integrated circuit 402 is based, at least in part, on the number and size of the array elements 502. As noted above, in some cases, the photonic integrated circuit 402 can be square with edges of about 40 mm in length. However, the photonic integrated circuit 402 can be scaled to smaller or larger sizes (such as about 2.5 cm by about 2.5 cm), while further scaling up to even larger sizes (such as about 20 cm by about 20 cm or about 30 cm by about 30 cm or larger, these sizes not intending to be limiting in any way) can be possible depending on fabrication capabilities.

Each array element 502 can include an antenna element 504, which is configured to physically transmit and/or receive one or more optical signal beams to or from one or more external devices or systems. For example, each antenna element 504 can represent a nanophotonic antenna or other antenna element that transmits at least one optical signal beamlet or receives optical energy in the array gain envelope, along with no lens or one or more lenses or other optical devices configured to focus or otherwise process the at least one optical signal beam. Depending on the implementation, the antenna element 504 can sometimes be referred to as an emitter in a transmitting array or a receiver in a receiving array. Each antenna element 504 can have any suitable size, shape, and dimensions. In some cases, the emitting/receiving surface of the antenna element 504 can be about 2 μm to about 4 μm in diameter.

Each antenna element 504 here is coupled to a signal pathway 506. The signal pathways 506 are configured to transport optical signals to and/or from the antenna elements 504. For example, the signal pathways 506 can provide optical signals to the antenna element 504 for transmission. Additionally or alternatively, the signal pathways 506 can provide optical signals received by the antenna elements 504 to optical detectors or other components for processing. Each signal pathway 506 includes any suitable structure configured to transport optical signals, such as an optical waveguide. Note that only a portion of the signal pathway 506 may be shown in FIG. 5, since a signal pathway 506 can vary based on how the associated array element 502 is designed and positioned within the photonic integrated circuit 402.

One or more modulators 508 is provided for each antenna element 504 and can be used (among other things) to control the phases and/or amplitudes of optical signals transmitted or received, or both (depending upon the configuration and the application or use), by the associated antenna element 504. For instance, in examples where the antenna elements 504 are transmitting, the modulators 508 can be used to achieve desired phases of outgoing optical signal beams in order to perform beam forming or beam steering. In examples where the antenna elements 504 are receiving, the modulators 508 can be used to apply phase control to the incoming wavefront of received optical signals in order to decompose or reconstruct the wavefront. In examples where both receiving and transmitting occurs, the modulators 508 can be used to both achieve desired phases of outgoing optical signal beams and to apply phase control to the incoming wavefront of received optical signals. Each modulator 508 can include any suitable structure configured to modulate the phase and/or amplitude of an optical signal, such as a resonant micro-ring modulator or a PN junction micro-ring modulator. In some cases, each modulator 508 can be a resonant micro-ring modulator that is about 4-6 μm in diameter, although modulators of other sizes can be used.

The modulators 508 of the photonic integrated circuit 402 can be electrically coupled to a digital read in integrated circuit (DRIIC) layer 510, which is used to provide electrical signals to the modulators 508 in order to control the phase and/or amplitude modulations applied to the incoming or outgoing optical signals by the modulators 508. The (DRIIC) design described herein can be tailored to the unique characteristics of optical phased arrays. Rather than using large break-out circuit boards and digital-to-analog converters, the DRIIC design can have a low profile and support operations such as flip-chip bonding to a photonic integrated circuit. In some cases, the DRIIC design integrates all PIC-related electronic controls into a hybridized or monolithic design. Also, the DRIIC design can support a unit cell architecture, where each DRIIC unit cell corresponds to and interacts with a corresponding PIC unit cell. This supports scalability of the PIC design as well as the DRIIC design to any suitable size. Overall, the DRIIC design helps to support various functions, such as beam forming and beam steering, in compact packages. The photonic integrated circuit 402 can be bonded to the DRIIC layer 510 using any mechanisms for electrically coupling the photonic integrated circuit PIC 402 and the DRIIC layer 510 can be used.

The DRIIC layer 510 in this example includes a number of individual DRIIC cells 512, where each DRIIC cell 512 can be associated with (and in some cases can have about the same size as) a corresponding one of the array elements 502. The DRIIC cells 512 control the phase modulations that are applied by the modulators 508 of the array elements 502. The DRIIC cells 512 can essentially function as digital-to-analog conversion devices, where digital programming (such as 1-bit, 2-bit, 8-bit, or other digital values) are converted into appropriately-scaled direct current (DC) analog voltages spanning a specific range of voltages. As a particular example, the DRIIC cells 512 can operate to convert digital values into suitable DC analog voltages between 0 V and 3.3 V, although other voltages (including negative voltages) can be supported depending on the implementation.

In this example, each DRIIC cell 512 can include a register 514 configured to store values associated with different phase shifts and/or amplitude changes to be applied by the modulator 508 of its corresponding array element 502. To provide a desired phase shift, appropriate values from the register 514 are selected and provided to two amplifiers 516 and 518, which generate output voltages that are provided to the associated modulator 508. The output voltages control the phase shift provided by the associated modulator 508. Different values from the register 514 are provided to the amplifiers 516 and 518 over time so that different output voltages are applied to the associated modulator 508. In this way, each DRIIC cell 512 can cause its associated modulator 508 to provide different phase shifts over time, thereby supporting various functions like beam forming, beam steering, or wavefront reconstruction.

In some embodiments, each DRIIC cell 512 can be used to provide a relatively small number of different output voltages to its associated modulator 508. For example, in some cases, each DRIIC cell 512 can cause the associated modulator 508 to provide four, or even 2, different phase shifts. However, other numbers of output voltages and associated phase shifts can be supported here, such as when up to 256 different phase shifts or more are supported. Also, the output voltages provided to the modulators 508 in different DRIIC cells 512 can be different even when those modulators 508 are providing the same phase shift, which can be due to factors such as manufacturing tolerances. The actual output voltages used for each modulator 508 can be selected during calibration so that appropriate values can be stored in each register 514.

In this example, the actual values in each DRIIC cell 512 that are provided to the amplifiers 516 and 518 by the register 514 over time can be controlled using a demultiplexer 520. Each demultiplexer 520 receives a stream of computed array phase shifts 522 and outputs the phase shifts 522 that are to be applied by that DRIIC cell's associated modulator 508. The phase shifts 522 output by the demultiplexer 520 can identify or otherwise to be used to select specific values from the register 514 to be output to the amplifiers 516 and 518. The computed array phase shifts 522 here can be provided by one or more external components, such as the electronic control board 408 or an external component communicating with the electronic control board 408. While not shown here, array-level deserialization circuitry can be used to separate and fan out high-speed digital signals to the array of individual DRIIC cells 512.

Each register 514 includes any suitable structure configured to store and retrieve values. Each amplifier 516 and 518 includes any suitable structure configured to generate a control voltage or other control signal based on an input. Each demultiplexer 520 includes any suitable structure configured to select and output values.

Note that this represents one example way in which the modulators 508 of the array elements 502 can be controlled. In general, any suitable technique can be used to provide suitable control voltages or other control signals to the modulators 508 for use in controlling the phase shifts provided by the modulators 508. For example, the approach shown in FIG. 5 allows values that are applied to the amplifiers 516 and 518 to be stored in the register 514 and retrieved as needed, which allows an external component to provide indicators of the desired values to be retrieved to the DRIIC cells 512. In other embodiments, an external component can provide digital values that are converted by different circuitry into analog values.

Various electrical connections 524 are provided in or with the DRIIC layer 510. The electrical connections 524 can be used to provide electrical signals to the DRIIC cells 512, such as when the electrical connections 524 are used to receive high-speed digital signals containing the computed array phase shifts 522 for the DRIIC cells 512. Any suitable number and arrangement of electrical connections 524 can be used here. A thermal spreader 526 can be positioned in thermal contact with the DRIIC layer 510 to provide a more consistent temperature across the DRIIC layer 510 and the photonic integrated circuit 402. The thermal spreader 526 can also provide thermal energy to the DRIIC layer 510 to heat the DRIIC layer 510 and the photonic integrated circuit 402 and can help to maintain a substantially constant temperature of the photonic integrated circuit 402. The thermal spreader 526 can be formed from any suitable material(s), such as one or more metals like copper, and in any suitable manner. The thermal spreader 526 can have any suitable size, shape, and dimensions.

Although FIGS. 3-5 illustrate one example of a photonic integrated circuit-based optical device 300, various changes can be made to FIGS. 3-5. For example, one or more photonic integrated circuits can be packaged in any other suitable manner, arranged relative to other components in any other suitable manner, and coupled to other components in any other suitable manner. Also, any other suitable modulation control approach and any other suitable thermal management approach can be used with one or more photonic integrated circuits.

Figure 6:
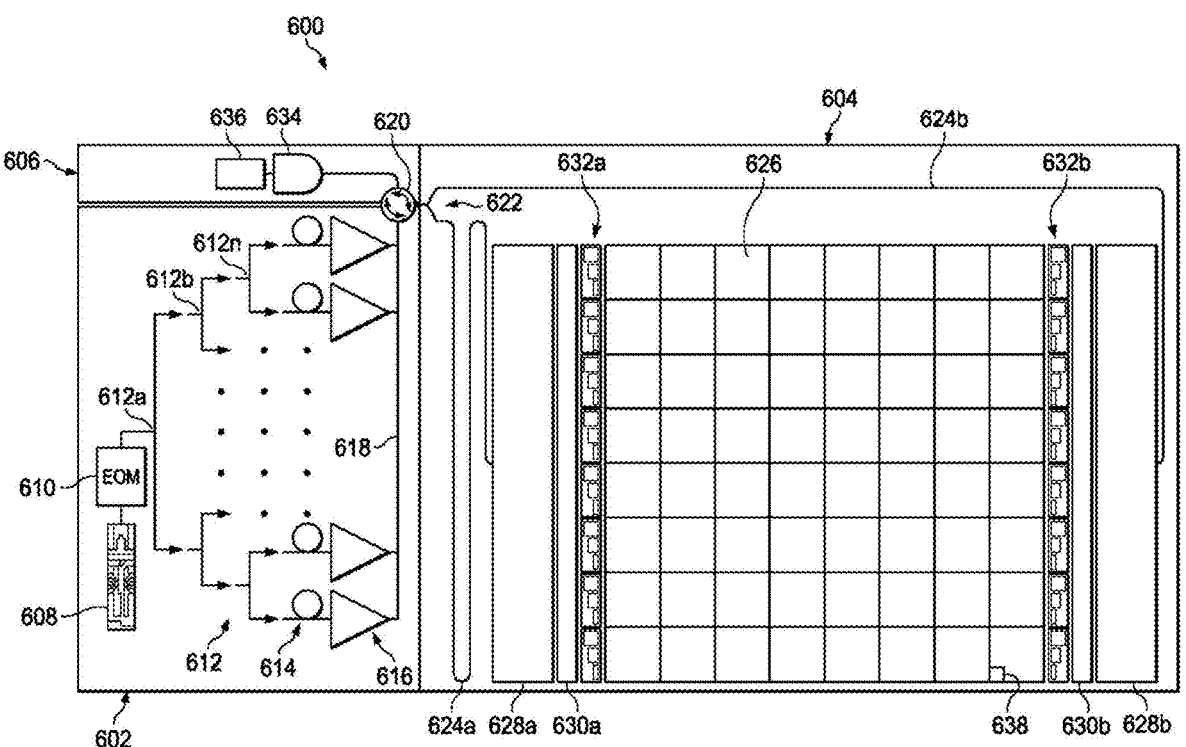
FIG. 6 shows a schematic view of an optical phased array (OPA) of the photonic integrated circuit of FIG. 3.
Figure 7:
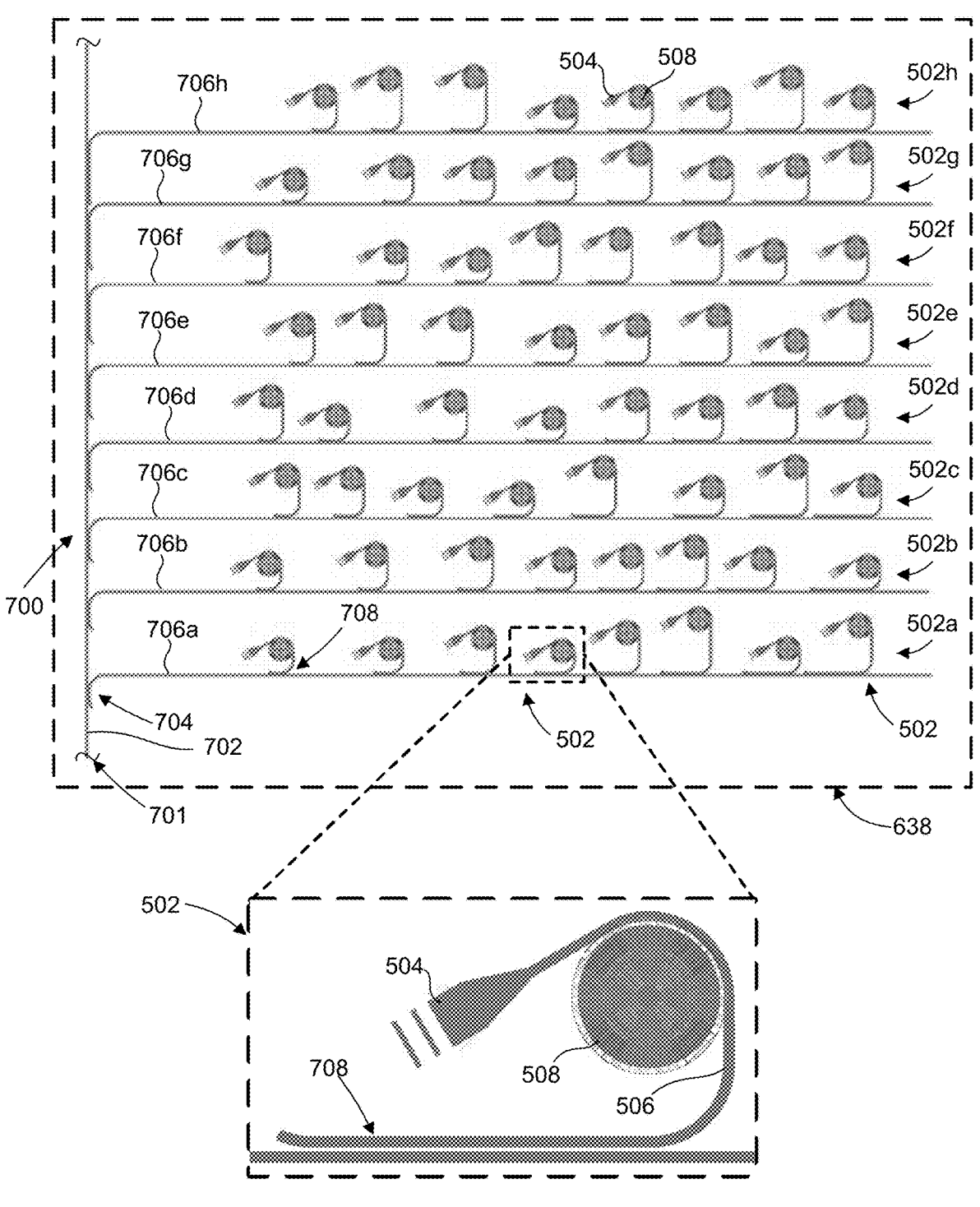
FIG. 7 shows a plan view of a portion of the optical phased array of FIG. 6 according to one example of the present disclosure.

FIGS. 6 and 7 illustrate a more specific example implementation of a photonic integrated circuit-based optical system including the photonic integrated circuit-based optical device 300 of FIGS. 3 through 5 according to this disclosure. In particular, FIGS. 6 and 7 illustrate an example architecture 600 that can be implemented within the optical device 300. As shown in FIG. 6, the architecture 600 can include a source laser 602, an OPA 604, and a receiver 606. The source laser 602 is an electromagnetic radiation (i.e., optical energy) source that generally operates to produce optical signals (e.g., electromagnetic radiation, or in other words, optical energy) that are provided to and are used by the OPA 604 to transmit outgoing optical signals. The OPA 604 generally operates to transmit outgoing optical signals and to receive incoming optical signals. The receiver 606 generally operates to process the incoming optical signals. These components allow the architecture 600 to support optical transceiver functionality, although some components (e.g., either the source laser 602 or the receiver 606) can be removed from the architecture 600 if only optical transmitter or only optical receiver functionality is desired.

In this example, the source laser 602 can include a laser 608, which operates to produce a lower-power input beam. The laser 608 can include any suitable structure configured to generate a laser output, such as a distributed feedback (DFB) diode laser. The lower-power input beam can have any suitable power level based on the laser 602 being used for a specific application. In some cases, the lower-power input beam can have a power level of one or several tens of milliwatts to one or several hundreds of milliwatts, although these values are for illustration only. Also, in some cases, the laser 602 can be fabricated using at least one group III element and at least one group V element and can therefore be referred to as a "III-V" laser. However, any other suitable materials can be used to fabricate the laser 602. The lower-power input beam is provided to an electro-optic modulator (EOM) 610, which can modulate the lower-power input beam based on an input electrical signal. The EOM 610 can provide any suitable modulation here, such as when the EOM 610 is implemented as a Mach-Zehnder modulator (MZM) that provides amplitude modulation.

A splitter 612 generally operates to split the modulated input beam into optical signals traveling over different optical pathways. In this example, the splitter 612 includes a hierarchical arrangement of splitters 612a-612n, each of which can receive and split an optical input in order to produce two optical outputs of substantially equal power. Note that the number of splitters 612a-612n and the number of hierarchical levels of splitters 612a-612n can vary based on the number of optical signals to be produced. For example, there can be five levels of splitters if thirty-two optical signals are desired or six levels of splitters if sixty-four optical signals are desired. Note, however, that other numbers of optical signals can be produced using any suitable number of splitters. Also note that any other suitable structure(s) can be used to split an optical signal, such as a multi-mode interferometer or a coupler tree.

The optical signals from the splitter 612 can be phase shifted using an array of phase shifters 614, where each phase shifter 614 can shift the phase of one of the optical signals. Each phase shifter 614 includes any suitable structure configured to phase-shift an optical signal, such as a resonant micro-ring modulator. In some embodiments, the resonant micro-ring modulators can be silicon-based and have diameters of about 5 microns to about 6 microns, although other implementations of the phase shifters 614 can be used.

The phase-shifted optical signals are provided to an array of semiconductor optical amplifiers (SOAs) 616. Each semiconductor optical amplifier 616 amplifies one of the phase-shifted optical signals to produce a higher-power version of that optical signal. Each semiconductor optical amplifier 616 represents any suitable semiconductor-based amplifier configured to amplify an optical signal. Each of the amplified optical signals can have any suitable power level based on the semiconductor optical amplifiers 616 being used. In some cases, the amplified optical signals can each have a power level of about 100 mW, although this value is for illustration only. The amplified optical signals can be combined and transported over an optical waveguide 618, which allows for source-coherent combination of the outputs from the semiconductor optical amplifiers 616 (since the amplifiers 616 form a phase-locked array of SOAs). The combined signal is provided to a circulator 620, which provides the combined signal to the OPA 604.

In the OPA 604, the combined signal is split by a splitter 622 so that substantially equal first portions of the combined signal are provided to two waveguides 624a-624b. The waveguides 624a-624b here can have substantially the same length so that there is little or no phase difference between the first portions of the combined signal exiting the waveguides 624a-624b. In this example, the photonic integrated circuit 402 is implemented using supercells 626, where each supercell 626 includes a subset of the array elements 502. In some embodiments, for example, each supercell 626 can include a 32×32 arrangement of array elements 502, although other numbers and arrangements of array elements 502 can be used in each supercell 626. In this particular example, the photonic integrated circuit 402 includes sixty-four supercells 626, although other numbers of supercells 626 can be used. Multiple supercells 626 can be driven using the same portion of the combined signal from the source laser 602, which helps to simplify phase control and other operations in the architecture 600. The ability to drive all array elements 502 in a supercell 626 collectively allows, for instance, amplitude modulation of each supercell 626 to control the transmit power of the array elements 502 in that supercell 626.

In the OPA 604, the laser output from the source laser 602 can be split by a splitter 622 so that substantially equal first portions of the combined signal are provided to two waveguides 624a and 624b. The waveguides 624a and 624b here can have substantially the same length so that there is little or no phase difference between the first portions of the combined signal exiting the waveguides 624*a* and 624*b*. In this example, the photonic integrated circuit 402 can be implemented using supercells 626, where each supercell 626 includes a portion of the array elements 502. In some embodiments, for example, each supercell 626 can include a 32×32 arrangement of array elements 502, although other numbers and arrangements of array elements 502 can be used in each supercell 626. In this particular example, the photonic integrated circuit 402 includes sixty-four super-cells 626, although other numbers of supercells 626 can be used. Multiple supercells 626 can be driven using the same portion of the combined signal from the source laser 602, which helps to simplify phase control and other operations in the architecture 600. The ability to drive all array elements 502 in a supercell 626 collectively allows, for instance, amplitude modulation of each supercell 626 to control the transmit power of the array elements 502 in that supercell 626.

In order to drive the supercells 626 using the combined signal from the source laser 602, the waveguides 624*a* and 624*b* provide the first portions of the combined signal to splitters 628*a* and 628*b*, such as 1×8 optical splitters, which split the first portions of the combined signal into more-numerous second portions of the combined signal. Additional splitters 630*a* and 630*b*, such as 8×32 splitters, split the second portions of the combined signal into even more-numerous third portions of the combined signal. This results in the creation of sixty-four optical signals, which can be used to drive the supercells 626. Note that this arrangement of 1×8 and 8×32 splitters is merely one example of how the supercells 626 in this specific photonic integrated circuit 402 can be driven. Other approaches can be used to drive a photonic integrated circuit 402, including approaches that use other numbers or arrangements of splitters. The specific approach shown in FIG. 6 is merely one example of how supercells 626 of this specific photonic integrated circuit 402 can be driven.

Time delay paths 632*a* and 632*b* are provided between the splitters 630*a* and 630*b* and the supercells 626 in order to compensate for different optical path lengths to reach the different supercells 626. For example, assuming that each row of supercells 626 in the photonic integrated circuit 402 is driven using four outputs from the splitter 630*a* and four outputs from the splitter 630*b*, without compensation, different outputs from the splitters 630*a* and 630*b* would reach different supercells 626 at different times, which can create undesired phase differences and reduce the throughput of the architecture 600. The time delay paths 632*a* and 632*b* represent spiraled or other optical pathways that delay at least some of the outputs from the splitters 630*a* and 630*b* so that the outputs from the splitters 630*a* and 630*b* reach all supercells 626 at substantially the same time. For example, the time delay paths 632*a* and 632*b* can delay signals to closer supercells 626 by larger amounts and delay signals to farther supercells 626 by smaller or no amounts. The optical signals that are received at the supercells 626 are used by the supercells 626 to produce outgoing optical signals.

The supercells 626 can receive incoming optical signals, which can be transported over the waveguides 624*a*-624*b* and through the circulator 620 to the receiver 606. In this example, the receiver 606 can include at least one photode-tector 634, such as at least one photodiode that converts the received incoming optical signals into electrical currents. A transimpedance amplifier 636 can convert the electrical currents into electrical voltages, which can then be further processed (such as to recover information contained in the incoming optical signals).

Note that various components of the OPA 604 and the source laser 602 can be fabricated from different materials in order to allow for different optical power levels to be used in the architecture 600. For example, components of the source laser 602 can be fabricated using silicon nitride, germanium, or other materials that allow the source laser 602 to generate a relatively high-power combined beam for the OPA 604. In the OPA 604, the waveguides 624*a* and 624*b* and the splitters 628*a* and 628*b* can similarly be fabricated using silicon nitride or other materials that sup-port the transport and splitting of the relatively high-power combined beam from the source laser 602. The splitters 630*a* and 630*b* can be fabricated using silicon (rather than silicon nitride) or other materials that can split lower-power optical signals (since the optical energy from the source laser 602 has already been split at this point). However, the components of the architecture 600 can be fabricated from any other suitable materials. Also note that various compo-nents of the architecture 600 may or may not be fabricated using one or more common materials.

In some embodiments, all of the components in the architecture 600 of FIG. 6 can be implemented in an integrated manner, such as when implemented using a single integrated electrical and photonic chip. As noted above, for example, different components of the architecture 600 can be fabricated using silicon and silicon nitride, which enables fabrication using standard silicon-based processes. When implemented in an integrated manner, the architecture 600 can be implemented using a single photonic integrated circuit chip, and there may be no need for components such as the fiber inputs/outputs 310, fiber mounts 404, and optical fibers 406. However, integration of the components in the architecture 600 is not necessarily required. Thus, for example, the source laser 602 can be implemented off-chip or replaced using a standard erbium-doped fiber amplifier laser or other external laser. As another example, the receiver 606 can be implemented off-chip.

Although FIGS. 6 and 7 illustrate one more specific example implementation of the photonic integrated circuit-based optical device of FIGS. 3-5, various changes can be made to FIGS. 6 and 7. For example, this particular embodi-ment logically splits the photonic integrated circuit 402 in half by using two waveguides 624*a*-624*b*, two sets of splitters 628*a*-628*b*, 630*a*-630*b*, and two sets of time delay paths 632*a*-632*b*. However, the photonic integrated circuit 402 can be logically split into other numbers of portions or not logically split. Also, various components in FIGS. 6 and 7 can be combined, further subdivided, replicated, omitted, or rearranged and additional components can be added according to particular needs.

A portion 638 of one of the supercells 626 is identified in FIG. 6 and shown, in at least one example configuration, in greater detail in FIG. 7. As shown in FIG. 7, this portion 638 of the supercell 626 includes an 8×8 arrangement of array elements 502, where each array element 502 has a similar structure to that shown in FIG. 5. As can be seen here, the structure of the array elements 502 can be modified as needed or desired. These array elements 502 are fed using a waveguide 700. As illustrated, the waveguide 700 can include main waveguide 702. The main waveguide 702 can be in optical communication with the source laser 602, and can be configured to receive electromagnetic radiation (e.g., optical signals) from the source laser 602. Splitters 704 can be positioned along the main waveguide 702 to split off portions of an optical signal propagating in the main waveguide 702. These portions of the optical signals split off of the main waveguide 702 are provided over branch waveguides 706a-706h that are optically coupled to the main waveguide 702 at a plurality of different locations from each other along the main waveguide 702, being coupled to the main waveguide 702 by the splitters 704. Splitters 708 can be positioned along the branch waveguides 706a-706h to further split off portions of the optical signal in the respective branch waveguides 706a-706h. Ideally, the splitters 704 and 708 are configured such that each of the array elements 502 receives a substantially equal portion of the optical signal input to the main waveguide 702. In some embodiments, the main waveguide 702, the branch waveguides 706a-706h, and the splitters 704, 708 can be formed from silicon, although other materials can be used.

Note that if each supercell 626 includes a 32×32 arrangement of array elements 502, each supercell 626 would include thirty-two rows of array elements 502, where each row includes thirty-two array elements 502. Thus, the portion 638 shown in FIG. 7 would be replicated sixteen times within each supercell 626. However, it is possible for the supercells 626 to each have a different number and arrangement of array elements 502 as needed or desired.

In FIG. 7, it can be seen that different path lengths exist between the input of the main waveguide 702 (located at the bottom of the main waveguide 702 in FIG. 7) and different array elements 502. In this particular example, the shortest path length exists between the input of the main waveguide 702 and the bottom left array element 502, and the longest path length exists between the input of the main waveguide 702 and the top right array element 502. As with the supercells 626 themselves, without compensation, these different path lengths would cause different portions of an optical signal to reach the array elements 502 at different times. In some cases, the phase shifts provided by the modulators 508 in the array elements 502 can be used to compensate for the different path lengths between the input of the main waveguide 702 and each array element 502. Additionally or alternatively, linear or other phase shifters can be used to compensate for the different path lengths between the input 701 of the main waveguide 702 and each array element 502.

Antenna Element Spacing in the Optical Phased Array

As shown in FIG. 7, each of the array elements 502 of the portion 638 of the OPA 604 can be spaced at irregular (e.g., aperiodic) locations along the waveguide 700. In other words, the array elements 502 are not spaced at regular distances from each other. In this example, each of the branch waveguides 706a-706h can be optically coupled to respective array element subsets 502a-502h. Each of the array elements 502 in a first array element subset 502a can be optically coupled to a first branch waveguide 706a. Furthermore, each of the array elements 502 in a second array element subset 502b can be optically coupled to a second branch waveguide 706b, each of the array elements 502 in a third array element subset 502c can be optically coupled to a third branch waveguide 706c, and so forth to the eighth array element subset 502h optically coupled to a eighth branch waveguide 706h. Eight subsets (e.g., 502a-502h) and eight branch waveguides (e.g., 706a-706h) are illustrated in FIG. 7. However, it is to be understood that any suitable number and arrangement of branch waveguides and subsets of array elements can be used here.

Figure 8:
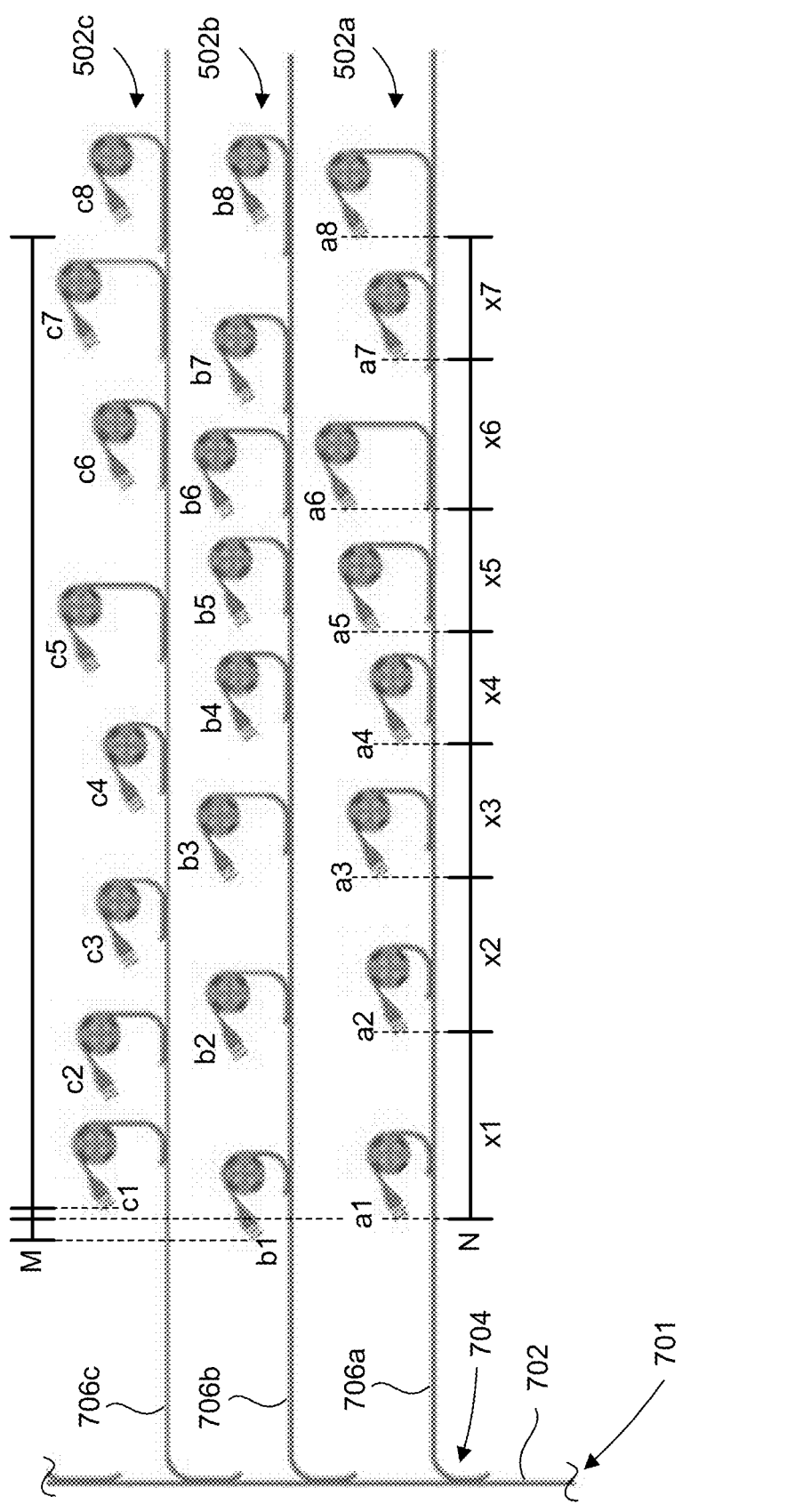
FIG. 8 shows a plan view of a portion of the optical phased array of FIG. 7.
Figure 9:
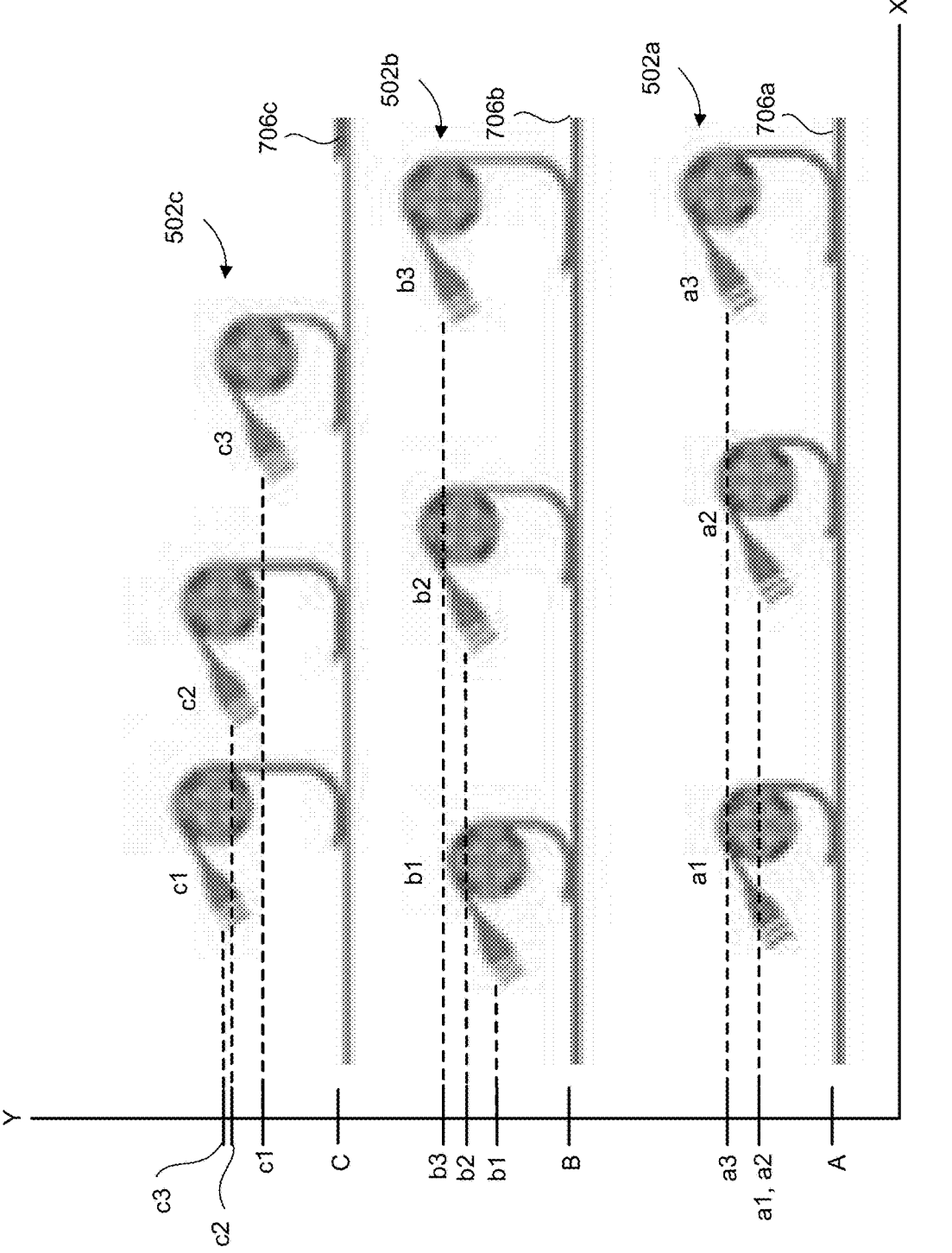
FIG. 9 shows a plan view of a portion of the optical phased array of FIG. 8.

FIGS. 7-9 illustrate the aperiodic nature of the placement and the spacing of the array elements 502 in the portion 638 of the OPA 604. As will be appreciated by observing FIG. 7, the array elements 502 can be spaced in the OPA 604 at positions that have no regular, perceivable pattern. Each of the array elements 502 can be positioned in the OPA 604 at different spacing from other adjacent array elements 502 than a neighboring array element 502.

FIG. 8 illustrates a portion of the array elements 502 of FIG. 7. As shown, each of the individual array elements 502 can have different spacings from neighboring/adjacent array elements 502. For example, the first subset 502a of array elements can include array elements a1-a8 that are each coupled to the first branch waveguide 706a. As shown, array elements a1 and a2 are spaced at a distance of x1 from each other along an axis N. Furthermore, array elements a2 and a3 are spaced at a distance of x2 from each other. Array elements a3 and a4 are spaced at a distance of x3 from each other. Array elements a4 and a5 are spaced at a distance of x4 from each other. Array elements a5 and a6 are spaced at a distance of x5 from each other. Array elements a6 and a7 are spaced at a distance of x6 from each other. And array elements a7 and a8 are spaced at a distance of x7 from each other. No perceivable pattern is apparent from the spacings of array elements a1-a8. Each of the distances x1-x7 can be different from each other and no graduation or reduction in distances x1-x7 can be seen moving from the array element a1 to array element a8. Accordingly, the spacing between array elements a1-a8 is random, or more specifically, pseudo-random.

"Pseudo-random," as used herein, is intended to mean spacing of array elements 502 with no apparent pattern or period of spacing being apparent in the array. Instead each of the array elements 502 are spaced relative to each other in such a way that no set distance, spacing, or positioning is defined between adjacent array elements. However, it is to be understood that pseudo-random does not mean that the array elements 502 are placed in the OPA 604 with no regard or planning as to where the array elements 502 should be placed. Instead, the array elements are positioned at places which are calculated to achieve a certain goal, metric, or property for the OPA 604 based on the positioning of the array elements 502. In this disclosure, the array elements are "pseudo-randomly" positioned in order to suppress side lobes or grating lobes, in an emitted optical signal beam transmitted from the antenna elements 504 of the array elements 502. The positions are further determined using an algorithm to establish peak-to-side-lobe intensity ratios of the emitted optical beam to be greater than a predetermined threshold value. The predetermined threshold value can be set to any value known to be appropriate for a particular application by those of ordinary skill in the art. For example, the threshold value can be at or about 60 dB, although larger and/or smaller values can be appropriate. For example, the threshold value can be a value within a range of at or between 30-90 dB depending on the application. Smaller values can be set as well, for example, values less than 30 dB, such as 9.6 dB shown in FIG. 11(*d*), and values of approximately 30 dB or less shown in FIG. 12(B) can be used as threshold values. Values of 30 dB or less can be used if further grating lobe suppression is desired. In general, a comparison of the intensity of the main lobe to the intensity of the grating lobes could be set at 1000:1 in order to ensure that the grating lobes are of a much smaller intensity than the main lobe. Although, it is to be understood that depending on the application, different threshold values or peak to side lobe ratios can be used if so desired by the user. Any desirable ratio or intensity threshold value can be used without any intended limitation.

Similar to the array elements a1-a8 of the subset 502*a*, the array elements b1-b8 and the array elements c1-c8 in each of the subsets 502*b* and 502*c* are positioned at pseudo random locations such that no perceivable pattern is apparent in the spacing of the array elements. This can also be true of subsets 502*d*-502*h*.

Furthermore, each of the array elements 502 in one subset (e.g., 502*a*) can have pseudo random (e.g., aperiodic) spacing relative to array elements 502 in another subset (e.g., 502*b*, 502*c*, etc.). For example, as shown in FIG. 8, the first array elements (e.g., a1, b1, and c1) in each of the subsets 502*a*, 502*b*, and 502*c* are positioned aperiodically with respect to one another. In the example shown in FIG. 8, the array element b1 is closer to the main optical waveguide 702 then both of the array elements a1 and c1. In addition, the array element a1 is closer to the main optical waveguide 702 then the array element c1. The positions of the array elements a1, b1, and c1 relative to each other show no perceivable pattern along axis M and are pseudo-random. It will be appreciated that the positions and spacing of other columns of array elements (e.g., corresponding array elements by order in each of the subsets 502*a*, 502*b*, and 502*c*) are also aperiodic and pseudo-random. In other words, the array elements a2, b2, and c2 are spaced aperiodically relative to each other; the array elements a3, b3, and c3 are spaced aperiodically relative to each other, and so forth on to the array elements a8, b8, and c8.

FIGS. 7 and 8 show the aperiodic positioning of the array elements 502 relative to each other in a horizontal direction on the OPA 604. In an additional view shown in FIG. 9, the positioning of the array elements 502 relative to each other in a vertical direction can also be aperiodic. For example, in subset 502*c*, each of the array elements c1, c2, and c3 are spaced at different heights relative to the branch waveguides 706*a*, 706*b*, and 706*c* along axis Y. Similarly, in subset 502*b*, each of the array elements b1, b2, and b3 are spaced at different heights relative to the branch waveguides 706*a*, 706*b*, and 706*c*. Similarly, in subset 502*a*, the array elements a1 and a2 are spaced at different heights relative to the branch waveguides 706*a*, 706*b*, and 706*c* than the array element a3. It is to be understood that the spacing and positioning of the array elements 502 pseudo-random even in a case in which two or more adjacent array elements 502 are spaced at a same distance with respect to another array element or waveguide. For example, the array elements a1 and a2 in the first subset 502*a* can have a same distance from the waveguide 706*a*. This does not destroy the pseudo-randomness of the spacing of the OPA 604 of the array elements 502. In other words, multiple array elements 502 can have similar positioning relative to certain landmarks (e.g., waveguides and/or other array elements) in the array and still be considered pseudo-random spacing/positioning.

Side Lobe Suppression and Scalability of the Array

The pseudo-random spacing of the array elements 502, as described above, is intended to achieve a narrow optical signal beam emitted from the OPA 604 while suppressing side/grating lobes that can cause interference and/or unwanted intensity. In the field of antenna technology, where signals are propagated using electromagnetic radiation and transmitted/received by an antenna, a distance between antenna elements in an array should be a half wavelength of the electromagnetic radiation used to carry the signal in order to properly suppress grating lobe interference on a main signal beam. For frequencies in the RF spectrum, in which the electromagnetic radiation can have wavelengths of around 1 meter to 10 kilometers for example, it is easily achievable to space array elements at half wavelength intervals (e.g., 1 meter to 5 kilometers). Even in cases in which wavelengths are 1 cm (i.e. 30 GHz), spacing array elements at half wavelength distances is easily achievable. However, in cases of photonic integrated circuits (PIC) and optical phased arrays (OPA), in which the wavelengths of optical signals are on the order of 0.5-10 micrometers, manufacturing difficulties and lack of space on PICs make it technologically challenging to space the array elements at distances of half a wavelength or less in more than one dimension to suppress side lobe interference.

Figure 10:
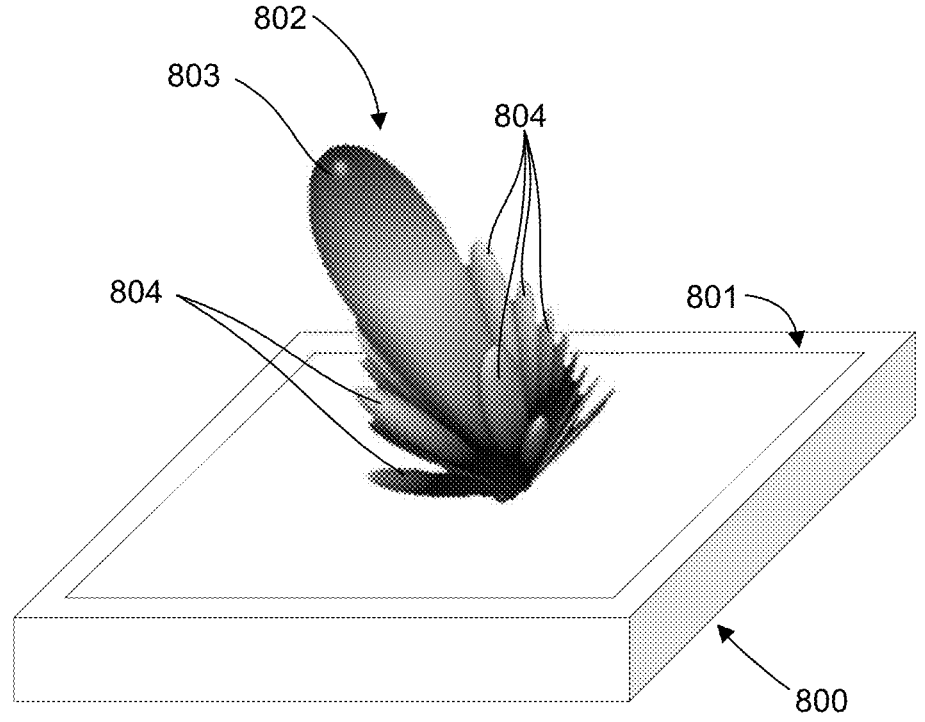
FIG. 10 shows an illustration of an optical signal beam emitted from an optical phased array of a photonic integrated circuit according to one example of the present disclosure.

FIG. 10 provides a demonstrative illustration of the problem of emission of an optical signal beam from a photonic integrated circuit (PIC) 800. As shown, the PIC 800 can include an optical phased array (OPA) 801 including multiple antenna elements that emit a steerable optical signal beam 802 including a main optical signal beam 803. In OPAs 801 spacing between antenna elements that is larger than half the wavelength of the optical signal beam 802, significant grating lobes 804, a type of side lobe, are also emitted in addition to the main optical signal beam 803. The grating lobes 804 are undesirable, particularly for steerable and directional optical signal beams that are intended to direct optical signals to a desired location with high accuracy and at a plurality of desirable trajectories. To prevent signal interference and to provide deterministic beam forming and control, it is desirable to suppress the side lobes 804 of the optical signal beam 802.

Figure 11:
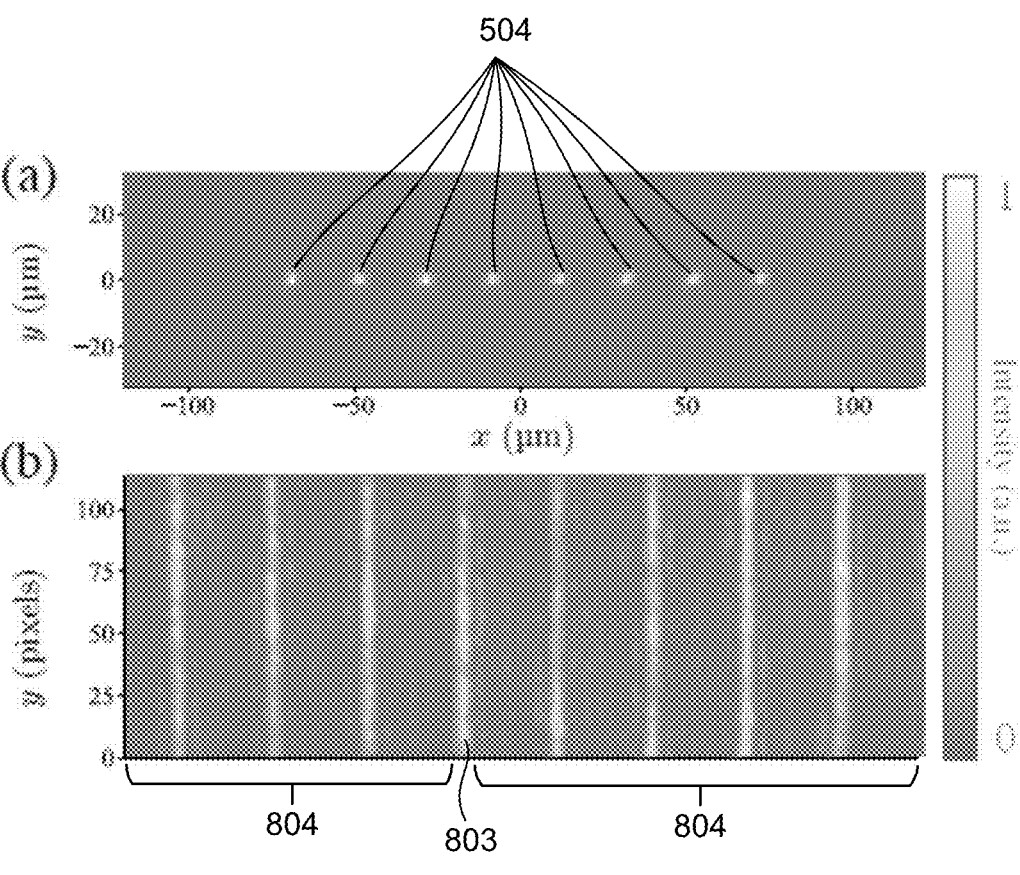
FIG. 11 shows graphs of intensities of main lobes and side lobes of an optical signal beam according to one example of the present disclosure.
Figure 11:
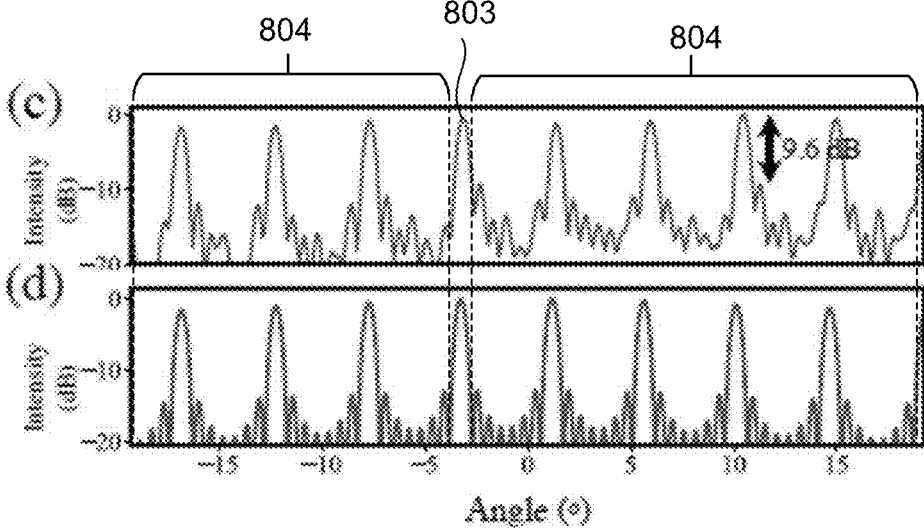

FIG. 11 illustrates near field antenna elements 504 in (a) and far field patterns (b) of an emitted optical signal beam 802 formed from a regular array of emitters (antenna elements) 504, shown here emitting optical radiation in the near field (a), and showing resultant grating lobes in (b.) 804. FIG. 11 in graphs (c) and (d) illustrate exemplar intensities of the main optical beam 803 and the grating and side lobes 804 according to an actual (c) and a theoretical (d) far field beam pattern. As will be appreciated by FIG. 11, the side lobes 804 can have significant intensity causing interference from the side lobes 804 and lack of clarity when steering and receiving the main optical beam 803 by a receiver. To maintain control of communication beam directionality of the main optical signal beam 803 and to avoid interference in a signal, it is therefore desirable to suppress the side lobes 804 of the optical signal beam 802.

As described above, to suppress grating lobes 804, the spacing of nano-antennas in an OPA should be half a wavelength of the optical signal beam 802. However, this is impractical in optical applications where the wavelength of the optical signal beam 802 is very, very small (e.g., micrometers), since the wavelength is smaller than the physical size of the array elements 502. Therefore, in order to avoid the interference caused by the grating lobes 804, a pseudo-random sparse array, as described herein, can be designed and implemented where the array elements are spaced apart by greater than a half wavelength of the optical signal beam. This provides an advantage in which the side/grating lobes 804 around an optical signal beam main lobe 803 can be suppressed. The pseudo-random spacing of the nano-antennas of the OPA 604 described herein can cause side lobes of the main optical signal beam to destructively interfere with each other such that the side lobes are suppressed, thereby allowing a main optical signal beam from the OPA 604 to reach a far-field plane without undesirable grating/side lobes.

In order to ensure proper side lobe suppression, the placement of each of the array elements 502, including the nano-antennas 504 and the phase modulators 508, is not random. Meaning that, although there seems to be no perceivable pattern in the placement of the array elements 502, the array elements are actually deterministically positioned using an iterative algorithm to establish a desirable layout and positioning of the array elements 502 in the OPA 604 that results in several characteristics and advantages of the array.

To design the array architecture of the OPA 604 (including placement of the array elements 502 and nano-antennas 504) a genetic optimization algorithm can be used to search for an array layout or architecture that provides an OPA 604 with desired specifications. To produce the desired specifications, a set of constraints can be defined in the algorithm such as spacing the antenna elements greater than ½ wavelength apart, defining a desired average sidelobe level as a threshold value, defining a desired peak sidelobe level as a threshold value, defining a desired peak to side lobe ratio (e.g., intensity of the peak of the optical signal beam compared to the side lobe intensity in ratio form) as a threshold value. For example, the maximum sidelobe peak relative to the main beam can be constrained such that is not allowed to be greater than −16 dB near the main beam and −10 dB at the edge of the field of view of the optical signal beam. Further constraints can include the beam width, power consumption, or other constraints desired by the designer.

A genetic algorithm is an algorithm for solving both constrained and unconstrained optimization problems that is based on natural selection. A genetic algorithm repeatedly modifies a population of individual solutions. At each step, the genetic algorithm selects individual solutions from the current population of solutions to be "parents" and uses them to produce the "children" for the next generation. Over successive generations, the population "evolves" toward an optimal solution. The genetic algorithm can be applied to solve a variety of optimization problems that are not well suited for standard optimization algorithms, including problems in which the objective function is discontinuous, non-differentiable, stochastic, or highly nonlinear.

For example, in determining positioning of array elements in a pseudo-random sparse array for nano-photonic antennas, the problem can be mapped to a grid containing possible placement positions at nodes of the grid. The grid can contain a number of nodes at intersections within the grid that are greater in number then the amount of array elements used for the OPA being designed. Each node can be either an filled node having an array element present or can be a vacant node with no array element present. Modeling of optical beam and array characteristics can be used to determine operation properties of the optical beam and array. Then each defined constraint can be monitored using different solutions of array element placement to see if a certain solution meets the desired design constraints. Iteration of solutions can then be carried out to find a best fit solution for placement of array elements to meet the defined constraints.

In other words, a genetic algorithm to design the placement of the array elements 502 can start with a set of randomly-generated possible solutions and move toward an optimal or acceptable solution of array element and nano-antenna placement. Every constraint can be encoded into a DNA which is a sequence of binary values uniquely representing a possible solution for placement of array elements in an OPA. Initially, the genetic algorithm generates a set of random solutions as the first generation of the solutions. The first generation of solutions can first be evaluated for fitness based on how well the solutions match the design criteria. Next, according to the optimization criteria (e.g., defined constraints), the fittest solutions are kept in the society and others are removed from the society (analogous to natural selection). Through iterations that cross over possible solutions remaining in the society after natural selection, the next generation of the society of solutions can be produced using a pair of parent solutions for each new member ("children") of the society of solutions. Child solutions can further be "mutated" by randomly flipping certain bits of the solutions to produce new solutions to be considered in future iterations. In subsequent iterations, the new solutions can be evaluated for fitness based on calculating how well each solution fits the design constraints, after which processes of natural selection, parent selection, child generation, mutation and further iteration can be carried out. As this process iterates, the society solutions evolve and move closer to the global optimum and/or acceptable solution for antenna element placement in order to achieve the goals of the design. The genetic algorithm is suitable for sparse array design on a grid since the presence or absence of each element at a node of the grid can be represented by a single bit (1 for presence of an element and 0 for absence of an element), resulting in a DNA with a small length and a fast and thorough search of multiple possible solutions.

Exemplar design constraints can include peak to side lobe ratio for the optical signal beam emitted by the array, greater than half wavelength spacing between array elements, maximum dimensions of array elements 502, maximum unit cell size, maximum array grid spacing, and maximum circular error probable (CEP) for the phase center location at differing scan angles.

For designing a pseudo-random sparse array of the present disclosure, solutions can be determined not for just peak to side lobe ratios for a single emission of an optical signal beam, but can consider multiple scan angles for the optical signal beam. For example, the OPA 604 of the present disclosure is for emission of a two-dimensionally steerable optical signal beam. The optical signal beam is intended to be steerable through a range of scan angles including multiple different scan angles (e.g., the beam can be steerable through a range of scan angles from +60 degrees to −60 degrees). While one solution of the genetic algorithm may meet the criteria of peak to side lobe ratios for one scan angle, it will be appreciated by those skilled in the art that steering the beam to other angles will affect side lobe intensity and can cause large side lobes at certain scan angles of the optical signal beam that are suppressed at other scan angles of the optical signal beam. Therefore, in accordance with the principles of the current disclosure, the placement of array elements 502 in the OPA 604 can be determined using the genetic algorithm to determine peak to side lobe ratios for the optical signal beam at each of a plurality of scan angles for the optical signal beam (e.g., degrees of −60, −59, −58, . . . 58, 59, 60, etc.).

By calculating the peak to side lobe ratios at a plurality of scan angles of the optical signal beam, the placements of the array elements 502 can be determined for the OPA 604 to provide a pseudo-random sparse array that has the following characteristics. The aperiodic locations of the array elements in the optical phased array (OPA) are set at pseudo-random positions such that an emitted optical signal beam from the plurality of array elements has peak to side lobe ratios that are greater than a predetermined threshold value (e.g., desired value set as a design constraint in the genetic algorithm) at each of a plurality of scan angles of the emitted optical beam.

The pseudo-random positions of the array elements can further be set such that the emitted optical signal beam from the plurality of array elements has peak to side lobe ratios that are greater than a predetermined threshold value at each of the plurality of scan angles between −60 degrees and +60 degrees, or any other range of scanning angles desired by the designer of the array.

The pseudo-random positions of the array elements are set such that the emitted optical signal beam is continuously steerable through the plurality of scan angles by control of phase adjustments made by one or more of the optical phase modulators. "Continuously steerable" in this disclosure is intended to mean that no intermediate indeterminate states exist between the plurality of scan angles.

Additionally, the array can be designed so that the pseudo-random positions of the array elements are set such that the emitted optical signal beam from the plurality of array elements is continuously steerable in two dimensions through the plurality of scan angles only by control of the phase adjustments made by one or more of the optical phase modulators, even with a single coherent wavelength of electromagnetic radiation supplied from the electromagnetic radiation source. For example, the laser 602 (e.g., optical energy source laser 608) can be configured to emit a single coherent wavelength of electromagnetic radiation. In many typical beam steering arrays, steering is carried out by scanning the source laser through different wavelengths of light. However, scanning through different wavelengths can cause side lobes to grow and can interfere with the main optical signal beam, as well as varying receive wavelength in receive mode for incoming radiation. In the principles of the present disclosure, however, maintaining the wavelength of the laser light at a single coherent wavelength and steering the beam only using phase adjustment allows for the placement of the array elements in the OPA to be designed and configured to allow full scanning through a plurality of range of angles without altering the wavelength of the laser source light. In other words, there is no need to scan through different wavelength of electromagnetic radiation to steer the beam; beam steering can be achieved by operation of the phase modulators alone. Furthermore, with the pseudo-random sparse array architecture described herein, and the large number of emitters 502 inherent in optical arrays, beam steering is possible with only using 2-bit or 1-bit phase adjustments applied by the optical phase modulators of the array elements. For example, the phase shift values applied by each modulator need only be 0 or π to adequately steer the beam given the large number of array elements that can operate to steer the beam.

Any other desired design criteria and constraints can be used for determining placement of array elements 502 in the OPA 604. For example, beam width of the optical signal beam can be constrained to a desired width. By iterating solutions to the genetic algorithm not for a range of scan angles of the optical signal beam, the design criteria and constraints can be met no matter where the beam is steered over the range of scan angles.

The side lobe suppression accomplished by the pseudo-random sparse array designs described herein allow for the PIC 402 to be scalable to any size, limited only by practical packaging constraints. Because the side lobe suppression is achieved by the pseudo-random placement of the array elements 502 (e.g., PIC unit cells of the photonic integrated circuit 402) the unit cells and the PIC 402 as a whole are no longer limited to maintaining a spacing between unit cells of a half wavelength of the electromagnetic radiation. Side lobes can be suppressed at spacings of greater than half-wavelength. This, therefore, facilitates scalability of the OPA, PIC, and unit cells of array elements described herein without risking degradation of optical beam signals. In other words, the deterministic placement of the array elements 502 through the genetic algorithm can suppress side lobes in optical arrays at any size desired, and for sparse arrays, allowing array baseline dimension to be decoupled from number of emitters, for example. The scalability also allows for extra room to accommodate optical and electrical routing without risking interference or overlapping in the routing.

Figure 12:
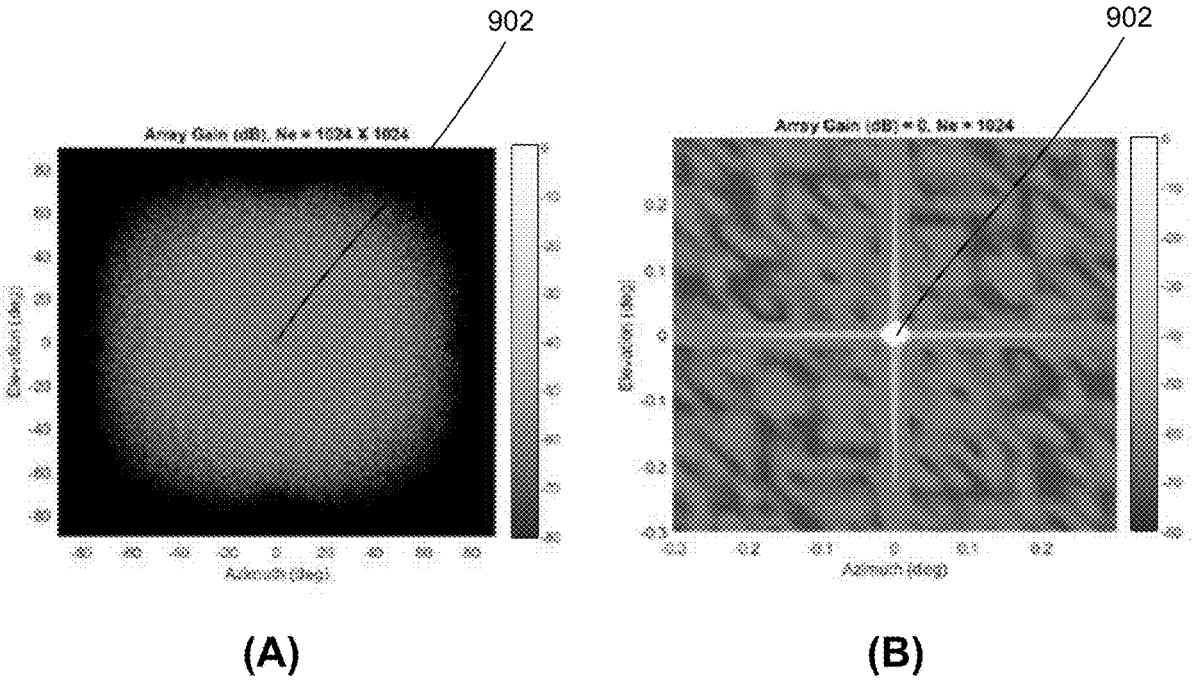
FIG. 12 shows a simulation of main lobes and side lobes of an optical signal beam emitted from an optical phased array according to one example of the present disclosure.

An example illustrating the side lobe suppression achieved by the principles described herein is illustrated in FIG. 12. In plot (A) of FIG. 12 a simulation of angular power distribution from 1024×1024 pseudo-random sparse array (RSA) design, according to the principles described herein, is shown. The plot (B) illustrates a zoomed-in display of a central 0.6×0.6 degree portion of the plot in (A). The beam 902, while too narrow to be adequately seen in the plot (A), is shown in plot (B). As can be appreciated from plot (A) sidelobes of any significant intensity are not shown in the plot (A). Furthermore, no significant side lobes are shown in the zoomed-in view of plot (B). A narrow, well-defined main lobe of the optical signal beam 902 is shown with narrow width.

Figure 13:
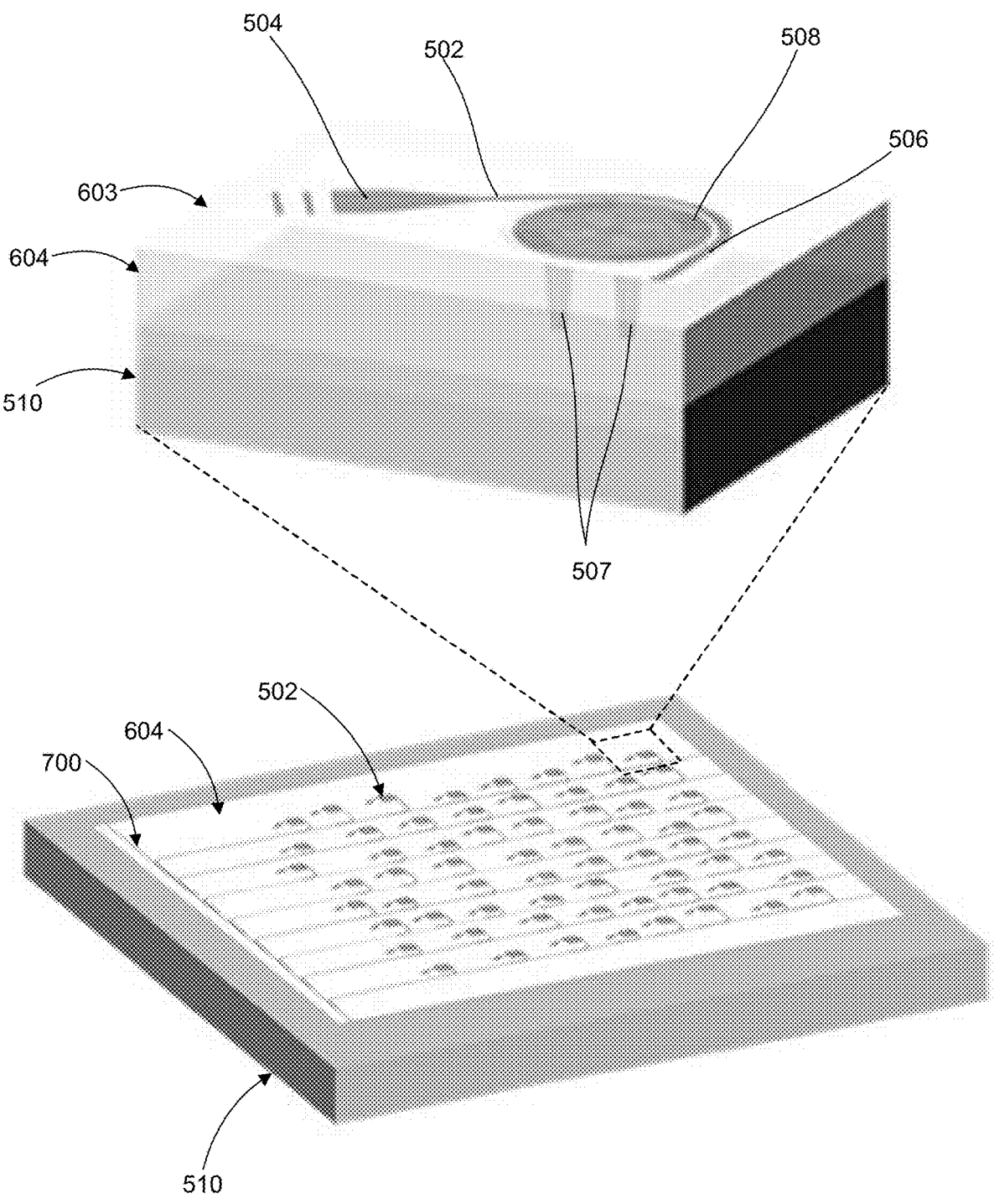
FIG. 13 shows perspective view of the photonic integrated circuit of FIG. 3.

FIG. 13 illustrates electrical connections between a phase modulator 508 of an array element 502 and an electronic layer 510 (e.g., DRIIC layer 510) of a photonic integrated circuit 402. The array element 502 can be part of the OPA 604 array of a plurality of array elements 502 The OPA 604, array elements 502, and waveguide 700 can comprise a photonics layer of the photonic integrated circuit 402. The photonic layer (including the OPA 604, array elements 502, and waveguide 700) can be supported by a substrate 603. As described elsewhere in this disclosure, various electrical connections can be provided in or with the DRIIC layer 510. The DRIIC layer can comprise CMOS electronics, or any other electronics suitable for controlling the phase modulators 508. The DRIIC layer 510 can also be referred to as an electronic layer 510. The DRIIC layer 510 can be disposed on a surface of the photonic layer (e.g., OPA 604). The DRIIC 510 can include a circuit board in electrical communication with each of the optical phase modulators 508 of the array elements 502. The digital read-in integrated circuit can be configured to apply voltages to control each of the optical phase modulators 508. The optical phase modulators 508 can each be electrically connected to the DRIIC layer 510 by one or more vias (e.g., through silicon vias or TSVs) formed through the substrate 603.

In alternative configurations, it will be appreciated that an on-chip electronic circuit can be disposed on the substrate 603 and be in electrical communication with the optical phase modulators 508 of each of the plurality of array elements 502. The on-chip electronic circuit can be configured to apply voltages to each of the optical phase modulators 508 to modulate the optical signal beams within a segment 506 of the waveguide in communication with the optical antenna 504.

Figure 14:
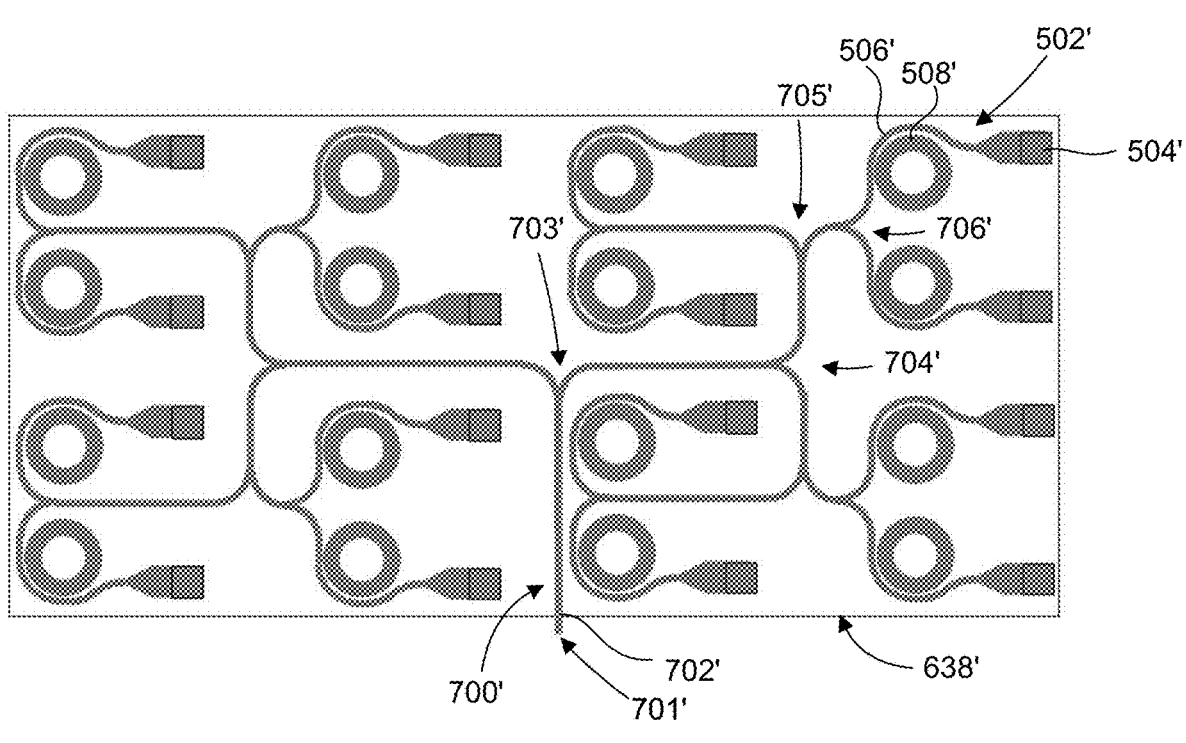
FIG. 14 shows plan view of waveguide routing on an optical phased array according to one example of the present disclosure.
Figure 15:
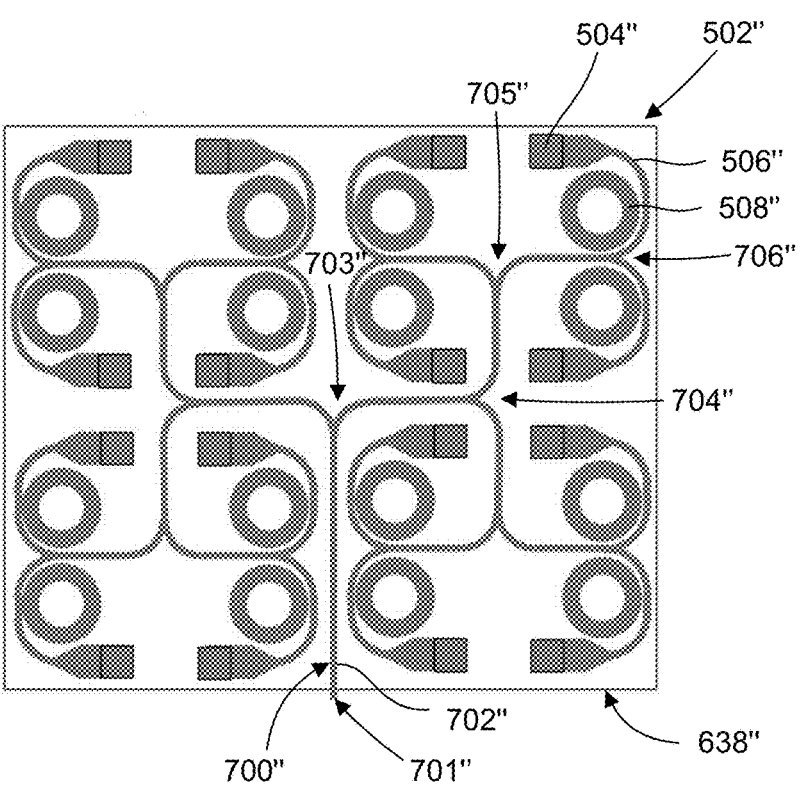
FIG. 15 shows plan view of waveguide routing on an optical phased array according to one example of the present disclosure.

Alternative waveguide routing structures are also within the scope of this disclosure to direct electromagnetic (optical) energy from a source laser (e.g., laser 602) to array elements 502' and 502" shown in FIGS. 14 and 15. In FIGS. 14 and 15, an H-tree structure of waveguides is shown for directing electromagnetic radiation to array elements 502' and 502" in respective OPA portions 638' and 638". As shown in FIG. 14, the OPA portion 638' can comprise a waveguide 702' with an input 701' for receiving electromagnetic radiation. The waveguide 702' can include a series of branches that branch the waveguide 702' into two substantially equal portions at a plurality of locations along the waveguide 702', including branches 703', 704', 705', and 706'. The branch 706' can branch the waveguide into two segments (e.g., segment 506') that each feed to an array element 502' that each face away from other array elements 502'. The array element 502' can include the segment 506', the optical phase modulator 508', and an antenna element 504'. This architecture can equally be used in the receive mode.

Similarly, as shown in FIG. 15, the OPA portion 638" can comprise a waveguide 702" with an input 701" for receiving electromagnetic radiation therein. The waveguide 702" can include a series of branches that branch the waveguide 702" into two substantially equal portions at a plurality of locations along the waveguide 702", including branches 703", 704", 705", and 706". The branch 706" can branch the waveguide into two segments (e.g., segment 506") that each feed to an array element 502" that each face toward other array elements 502". The array element 502" can include the segment 506", the optical phase modulator 508", and an antenna element 504".

While FIGS. 14 and 15 show the antenna elements 504' and 504" at equally spaced distances from each other, it is to be understood that the same pseudo-random spacing of array elements shown in FIG. 7 can apply to the array elements 502' and 502" shown in FIGS. 14 and 15 to achieve the same design objectives of portion 638 in portions 638' and 638". Other routings of waveguides are intended to be included in the scope of this disclosure as well, such as cascading trees, or other configurations.

Further contemplated by this disclosure is a method 1000 of configuring a photonic integrated circuit (PIC). The method is illustrated in FIG. 16. The method can include a step 1002 of configuring the photonic integrated circuit (PIC) to include a substrate. The method can further include a step 1004 of configuring the photonic integrated circuit (PIC) to include a waveguide at least partially supported by the substrate. The waveguide can be in communication with at least one of an electromagnetic radiation (i.e., optical energy) source and a receiver, the waveguide being configured to facilitate the propagation of optical signal beams. The method can further include a step 1006 of configuring the photonic integrated circuit (PIC) to include an optical phased array (OPA) comprising a plurality of array elements. Each of the plurality of array elements can comprise an optical antenna and an optical phase modulator associated with the optical antenna. The optical phase modulator can be operable to modulate the optical signal beams within a segment of the waveguide in communication with the optical antenna. The method can further include a step 1008 wherein locations of at least some of the plurality of array elements are aperiodic in one or more directions on the substrate.

The method can further include a step of determining positions of the plurality of array elements at the aperiodic locations based on solutions from a genetic algorithm as described herein. The method can further include a step of positioning the array elements in aperiodic locations in the optical phased array (OPA) such that an emitted optical signal beam from the plurality of array elements has a peak to side lobe ratio that is greater than a predetermined threshold value, wherein the peak to side lobe ratio comprises a ratio of a peak beam intensity to a grating lobe intensity in the emitted beam.

The method can further include a step of positioning the array elements in aperiodic locations in the optical phased array (OPA) such that an emitted optical signal beam from the plurality of array elements has peak to side lobe ratios that are greater than a predetermined threshold value at each of a plurality of scan angles of the emitted optical beam. The method can further include a step of positioning the array elements in aperiodic locations in the optical phased array (OPA) such that the emitted optical signal beam from the plurality of array elements has peak to side lobe ratios that are greater than a predetermined threshold value at each of a plurality of scan angles between −60 degrees and +60 degrees. The method can further include a step of positioning the array elements in aperiodic locations in the optical phased array (OPA) such that such that the emitted optical signal beam is continuously steerable through the plurality of scan angles by control of phase adjustments made by one or more of the optical phase modulators.

The method can further include a step of positioning the array elements in aperiodic locations in the optical phased array (OPA) such that the emitted optical signal beam from the plurality of array elements is continuously steerable through the plurality of scan angles by control of the phase adjustments made by one or more of the optical phase modulators with a single coherent wavelength of electromagnetic radiation supplied from the electromagnetic radiation source. The method can further include a step of positioning the array elements in aperiodic locations in the optical phased array (OPA) such that the emitted optical signal beam from the plurality of array elements is steerable in two dimensions by control of the phase adjustments made by one or more of the optical phase modulators.

The method can further include a step of positioning the array elements in aperiodic locations in the optical phased array (OPA) such that the array elements are spaced greater than a half-wavelength away from each other with respect to the wavelength of electromagnetic radiation provided by a laser source.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A photonic integrated circuit (PIC) comprising:
a substrate;
a waveguide at least partially supported by the substrate, the waveguide being in communication with at least one of an electromagnetic radiation source and a receiver, the waveguide being configured to facilitate the propagation of optical signal beams;
an optical phased array (OPA) comprising a plurality of array elements, each of the plurality of array elements comprising:
an optical antenna; and
an optical phase modulator associated with the optical antenna, and operable to modulate the optical signal beams within a segment of the waveguide in communication with the optical antenna;
wherein at least some array elements of the plurality of array elements are optically coupled to the waveguide at aperiodic locations on the substrate,
wherein aperiodic locations of the array elements in the OPA are set such that an emitted optical signal beam, or a receive beam gain envelope, from the plurality of array elements has a peak to side lobe ratio that is greater than a predetermined threshold value ranging from 9.6 decibels (dB) to 90 dB, the peak to side lobe ratio comprising a ratio of a peak beam intensity/gain to a grating lobe intensity/gain in the emitted beam, and
wherein the aperiodic locations of the array elements in the OPA are pseudo-random positions set such that an emitted optical signal beam, or a receive beam gain envelope, from the plurality of array elements has peak to side lobe ratios that are greater than a predetermined threshold value ranging from 9.6 decibels (dB) to 90 dB at each of one or a plurality of scan angles of the emitted optical beam.

2. The photonic integrated circuit (PIC) of claim 1, wherein the optical phased array is a sparse array in which the plurality of array elements are positioned such that a distance between array elements is greater than ½ of a wavelength of the electromagnetic radiation from the electromagnetic radiation source.

3. The photonic integrated circuit (PIC) of claim 1, wherein the plurality of scan angles of the emitted optical beam, or a receive beam gain envelope, comprise angles between −60 degrees and +60 degrees, and wherein the pseudo-random positions of the array elements are set such that the emitted optical signal beam, or a receive beam gain envelope, from the plurality of array elements has peak to side lobe ratios that are greater than the predetermined threshold value at each of the plurality of scan angles between −60 degrees and +60 degrees.

4. The photonic integrated circuit (PIC) of claim 1, wherein a pseudo-random positions of the array elements are set such that the emitted optical signal beam, or receive beam gain envelope, is continuously steerable through the plurality of scan angles by control of phase adjustments made by one or more of the optical phase modulators.

5. The photonic integrated circuit (PIC) of claim 4, wherein the pseudo-random positions of the array elements are set such that the emitted optical signal beam, or receive beam gain envelope, from the plurality of array elements is continuously steerable through the plurality of scan angles by control of the phase adjustments made by one or more of the optical phase modulators with a single coherent wavelength of electromagnetic radiation supplied from the electromagnetic radiation source.

6. The photonic integrated circuit (PIC) of claim 4, wherein the pseudo-random positions of the array elements are set such that the emitted optical signal beam, or receive beam gain envelope, from the plurality of array elements is steerable in two dimensions by control of the phase adjustments made by one or more of the optical phase modulators.

7. The photonic integrated circuit (PIC) of claim 1, wherein locations of at least some of the plurality of array elements are aperiodic in one or more directions on the substrate.

8. The photonic integrated circuit (PIC) of claim 1, further comprising at least one of:
a source laser as the electromagnetic radiation source configured to generate optical energy, the antenna elements configured to transmit the optical signal beams based on the optical energy; and
a receiver configured to receive and process the optical signal beams received by the antenna elements.

9. The photonic integrated circuit (PIC) of claim 8, wherein the source laser generates optical energy at a single coherent wavelength.

10. The photonic integrated circuit (PIC) of claim 1, wherein the waveguides comprise optical waveguides.

11. The photonic integrated circuit (PIC) of claim 1, comprising:
an on-chip electronic circuit disposed on the substrate, and in electrical communication with the optical phase modulators of each of the plurality of array elements, the on-chip electronic circuit configured to apply voltages to each of the optical phase modulators to modulate the optical signal beams within a segment of the waveguide in communication with an optical antenna.

12. The photonic integrated circuit (PIC) of claim 1, comprising:
a plurality of layers comprising:
a photonic layer comprising the optical phased array (OPA) and the waveguide;
an electronic layer comprising a digital read-in integrated circuit (DRIIC) in electrical communication with each of the optical phase modulators of the array elements, the digital read-in integrated circuit being configured to apply voltages to control each of the optical phase modulators.

13. The photonic integrated circuit (PIC) of claim 12, wherein the electronic layer comprises one or more CMOS circuits.

14. The photonic integrated circuit (PIC) of claim 12, wherein the electronic layer comprises one or more CMOS circuits.

15. A photonic integrated system comprising:
an electromagnetic radiation source; and
a photonic integrated circuit (PIC) comprising:
a substrate;
a waveguide at least partially supported by the substrate, the waveguide being in communication with at least one of an electromagnetic radiation source and a receiver, the waveguide being configured to facilitate the propagation of optical signal beams;

an optical phased array (OPA) comprising a plurality of array elements, each of the plurality of array elements comprising:

an optical antenna; and an optical phase modulator associated with the optical antenna, and operable to modulate the optical signal beams within a segment of the waveguide in communication with the optical antenna;

wherein at least some array elements of the plurality of array elements are optically coupled to the waveguide at aperiodic locations on the substrate, wherein aperiodic locations of the array elements in the OPA are set such that an emitted optical signal beam, or a receive beam gain envelope, from the plurality of array elements has a peak to side lobe ratio that is greater than a predetermined threshold value ranging from 9.6 decibels (dB) to 90 dB, the peak to side lobe ratio comprising a ratio of a peak beam intensity/gain to a grating lobe intensity/gain in the emitted beam, and wherein the aperiodic locations of the array elements in the OPA are pseudo-random positions set such that an emitted optical signal beam, or a receive beam gain envelope, from the plurality of array elements has peak to side lobe ratios that are greater than the predetermined threshold value at each of a plurality of scan angles of the emitted optical beam.

16. The photonic integrated system of claim 15, wherein the optical phased array is a sparse array in which the plurality of array elements are positioned such that a distance between array elements is greater than ½ of a wavelength of the electromagnetic radiation from the electromagnetic radiation source.

17. A method of configuring a photonic integrated circuit (PIC), the method comprising:

configuring the photonic integrated circuit (PIC) to include a substrate;

configuring the photonic integrated circuit (PIC) to include a waveguide at least partially supported by the substrate, the waveguide being in communication with at least one of an electromagnetic radiation source and a receiver, the waveguide being configured to facilitate the propagation of optical signal beams;

configuring the photonic integrated circuit (PIC) to include an optical phased array (OPA) comprising a plurality of array elements, each of the plurality of array elements comprising:

an optical antenna; and an optical phase modulator associated with the optical antenna, and operable to modulate the optical signal beams within a segment of the waveguide in communication with the optical antenna; and configuring at least some array elements of the plurality of array elements to be optically coupled to the waveguide wherein locations of at least some of the plurality of array elements are aperiodic in one or more directions on the substrate, wherein aperiodic locations of the array elements in the OPA are set such that an emitted optical signal beam, or a receive beam gain envelope, from the plurality of array elements has a peak to side lobe ratio that is greater than a predetermined threshold value ranging from 9.6 decibels (dB) to 90 dB, the peak to side lobe ratio comprising a ratio of a peak beam intensity/gain to a grating lobe intensity/gain in the emitted beam, and wherein the aperiodic locations of the array elements in the OPA are pseudo-random positions set such that an emitted optical signal beam, or a receive beam gain envelope, from the plurality of array elements has peak to side lobe ratios that are greater than the predetermined threshold value ranging from degrees at each of a plurality of scan angles of the emitted optical beam.

\* \* \* \* \*